US011228354B2

(12) United States Patent
Lee

(10) Patent No.: US 11,228,354 B2
(45) Date of Patent: *Jan. 18, 2022

(54) MULTI-SITE MIMO COMMUNICATIONS SYSTEM WITH HYBRID BEAMFORMING IN L1-SPLIT ARCHITECTURE

(71) Applicant: AltioStar Networks, Inc., Tewksbury, MA (US)

(72) Inventor: Jung Ah Lee, Pittstown, NJ (US)

(73) Assignee: AltioStar Networks, Inc., Tewksbury, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/868,356

(22) Filed: May 6, 2020

(65) Prior Publication Data

US 2020/0266864 A1 Aug. 20, 2020

Related U.S. Application Data

(63) Continuation of application No. 15/889,673, filed on Feb. 6, 2018, now Pat. No. 10,673,502.

(Continued)

(51) Int. Cl.
*H04L 27/26* (2006.01)
*H04B 7/04* (2017.01)
(Continued)

(52) U.S. Cl.
CPC ......... *H04B 7/0617* (2013.01); *H04B 7/0456* (2013.01); *H04B 7/06* (2013.01);
(Continued)

(58) Field of Classification Search
CPC ...... H04B 7/0413; H04B 7/06; H04B 7/0456; H04B 7/0617; H04B 7/0682;
(Continued)

(56) References Cited

U.S. PATENT DOCUMENTS 8,923,386 B2 * 12/2014 Samardzija ............. H03M 7/30
375/240
9,917,628 B2 * 3/2018 Liang ................... H04B 7/0695
(Continued)

FOREIGN PATENT DOCUMENTS

RU 2468532 C2 11/2012
WO 2013/084058 A1 6/2013
(Continued)

OTHER PUBLICATIONS

International Search Report and Written Opinion corresponding to International Patent Application No. PCT/US2018/16988, dated Aug. 1, 2018, 15 pages.

(Continued)

*Primary Examiner* — Edan Orgad
*Assistant Examiner* — Vanneilian Lalchinthang
(74) *Attorney, Agent, or Firm* — Mintz Levin Cohn Ferris Glovsky and Popep, P.C.

(57) ABSTRACT

A system, a method, and a computer program product for transmission of data using a multiple input, multiple output communications system with hybrid beamforming in a layer 1 split architecture. A first portion of a signal is processed at a first portion of a physical layer located in a first portion of a base station. A frequency domain compression with statistical multiplexing is applied to the processed first portion of the signal. A compressed first portion of the signal is generated. The compressed first portion of the signal and a second portion of the signal are transmitted to a second portion of the physical layer located in a second portion of the base station.

16 Claims, 25 Drawing Sheets

Related U.S. Application Data

(60) Provisional application No. 62/455,315, filed on Feb. 6, 2017.

(51) Int. Cl.
*H04B 7/06* (2006.01)
*H04W 28/02* (2009.01)
*H04J 3/16* (2006.01)
*H04B 7/0456* (2017.01)
*H04L 29/06* (2006.01)
*H04W 88/08* (2009.01)

(52) U.S. Cl.
CPC ............ *H04J 3/1682* (2013.01); *H04L 69/04* (2013.01); *H04W 28/0289* (2013.01); *H04W 88/085* (2013.01)

(58) Field of Classification Search
CPC .............. H04B 7/0697; H03M 7/3068; H03M 7/3059; H04J 3/1682; H04L 27/2602; H04L 69/04; H04L 5/0007; H04L 27/2605; H04W 28/0289; H04W 88/085
USPC ........................................................ 370/230
See application file for complete search history.

(56) References Cited

U.S. PATENT DOCUMENTS

| | | | |
|---|---|---|---|
| 2011/0217921 A1* | 9/2011 | Larsson | H04B 7/15557 455/7 |
| 2013/0028117 A1* | 1/2013 | Montojo | H04L 5/001 370/252 |
| 2014/0226481 A1* | 8/2014 | Dahod | H04W 72/04 370/235 |
| 2015/0296390 A1* | 10/2015 | Mino Diaz | H04W 72/0453 455/450 |
| 2015/0372728 A1* | 12/2015 | Rahman | H04B 7/0456 370/329 |
| 2016/0080051 A1* | 3/2016 | Sajadieh | H04B 7/0452 375/267 |
| 2017/0238361 A1* | 8/2017 | Pawar | H04W 88/085 455/561 |
| 2018/0159611 A1* | 6/2018 | Majmundar | H04L 47/38 |
| 2018/0227028 A1 | 8/2018 | Lee | |

FOREIGN PATENT DOCUMENTS

| | | | | |
|---|---|---|---|---|
| WO | WO-2013084058 A1 * | 6/2013 | | H03M 7/3059 |
| WO | 2014/076004 A2 | 5/2014 | | |
| WO | 2015/115776 A1 | 8/2015 | | |
| WO | 2016/115545 A2 | 7/2016 | | |
| WO | 2018/145062 A2 | 8/2018 | | |

OTHER PUBLICATIONS

International Search Report and Written Opinion corresponding to International Patent Application No. PCT/US2018/16989, dated May 15, 2018, 12 pages.

* cited by examiner

FIG. 4. CONTINUED

| | Opt. 1 | Opt. 2 | Opt. 3-2 | Opt. 3-1 | Opt. 5 | Opt. 6 | Opt. 7-3 (only for dl) | Opt. 7-2 | Opt. 7-1 | Opt. 8 |
|---|---|---|---|---|---|---|---|---|---|---|
| Baseline available | No | Yes(LTE DC) | | | | No | | | | Yes (CPRI) |
| Traffic aggregation | No | | | | | Yes | | | | |
| ARQ location | | DU | | | | CU | | | | |
| Resource pooling in CU | Lowest | | RRC+L2 (partial) | | | RRC + L2 | RRC + L2 + PHY (partial) | | | Highest |
| | RRC only | | | | | | | | | RRC + L2 + PHY |
| Transport NW latency requirement | | Loose | | | | May be more robust under non-ideal transport conditions | | | | |
| | | | | | FFS | | | Tight | | |
| Transport NW Peak BW requirement | N/A | Lowest | | in between (higher on the right) | | | | | | Highest |
| | No UP req. | | baseband bits | | | | | | | Quant. IQ (i) |
| | | | Scales with MIMO layers | | | | | Quantized IQ (i) | | |
| Multi-cell/freq. coordination | — | multiple schedulers (independent per DU) | | | | centralized scheduler (can be common per CU) | | | Scales with antenna ports | |
| UL Adv. Rx | | FFS | | | | | N/A | FFS | | Yes |

400

| Category | Precoding in DU | Precoding in RU |
|---|---|---|
| Precoding vector calculation | • Can be computed locally in DU | • CSI information has to be sent from DU to RU (Stringent transport latency requirement for dynamic TTI-level precoding) |
| Precoding vector update rate | • Dynamic update per TTI | • Update rate depending on transport latency |
| Distributed MIMO | • Easily computed from CSI feedback in DU | • Precoding vector and the user-level data has to be sent to multiple Rus |

FIG. 7.

MULTI-SITE MIMO COMMUNICATIONS SYSTEM WITH HYBRID BEAMFORMING IN L1-SPLIT ARCHITECTURE

CROSS-REFERENCE TO RELATED APPLICATIONS

The present application is a continuation of and claims priority to U.S. patent application Ser. No. 15/889,673 to Lee, filed Feb. 6, 2018, and entitled "Multi-Site MIMO Communications System with Hybrid Beamforming In L1-Split Architecture," which claims priority to U.S. Provisional Patent Appl. No. 62/455,315 to Lee, filed Feb. 6, 2017, and entitled "Multi-Site MIMO Communications System with Hybrid Beamforming In L1-Split Architecture", and incorporates their disclosures herein by reference in their entireties.

TECHNICAL FIELD

In some implementations, the current subject matter relates to telecommunications systems, and in particular, to a multiple input, multiple output ("MIMO") communications system with hybrid beamforming in a layer 1 split architecture, where the communications system can include 5G New Radio ("NR") communications systems.

BACKGROUND

In today's world, cellular networks provide on-demand communications capabilities to individuals and business entities. Typically, a cellular network is a wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide improved service within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if when mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile; in rural areas, the range can be as much as 5 miles; and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. A 5G LTE standard is currently being developed. LTE is based on the GSM/EDGE and UMTS/HSPA digital cellular technologies and allows for increasing capacity and speed by using a different radio interface together with core network improvements.

Mobile devices are used for receiving and transmitting of various types of data, such as, voice data (e.g., telephone calls), emails, text messages, Internet browsing, video data (e.g., videos, video calling, augmented/virtual reality, etc.), audio data (e.g., streaming of songs), etc. Different types of data can require different transmission bandwidth. For example, in order to reproduce a high-definition video on a mobile device having a good quality, a higher bandwidth may be required as compared to transmission of an email or a text message to the mobile device.

SUMMARY

In some implementations, the current subject matter relates to a computer-implemented method for transmission of data using a multiple input, multiple output communications system with hybrid beamforming in a layer 1 split architecture. The method can include processing a first portion of a signal at a first portion of a physical layer located in a first portion of a base station, applying a frequency domain compression with statistical multiplexing to the processed first portion of the signal, generating a compressed first portion of the signal, and transmitting the compressed first portion of the signal and a second portion of the signal to a second portion of the physical layer located in a second portion of the base station.

In some implementations, the current subject matter can include one or more of the following optional features. The first portion of the base station can include a remote unit and the second portion of the base station can include a digital unit. The first portion and the second portion can be communicatively coupled using a fronthaul link.

In some implementations, transmission can further include transmitting the compressed first portion of the signal and the second portion of the signal using multiple input multiple output processing. The multiple input multiple output processing can include at least one of the following: a single-site multiple input multiple output processing, a multiple-site multiple input multiple output processing, and a distributed multiple input multiple output processing.

In some implementations, transmission can further include performing hybrid beamforming of the signal during transmission from the first portion of the base station to the second portion of the base station. In some implementations, hybrid beamforming can include digitally combining one or more signals using at least one of the first portion and the second portion of the base station, and generating, based on the digitally combined signals, one or more beamformed analog signals for transmission by one or more antennas communicatively coupled to the base station.

In some implementations, the hybrid beamforming further includes modulating the first portion of the signals, mapping the modulated first portion of the signals to at least one portion of the physical layer, pre-coding mapped modulated first portion of the signals using at least one sub-band pre-coding matrix indicator, where the sub-band pre-coding matrix indicator can be selected for each beam for transmission of the signals, assigning one or more resources to pre-coded first portion of the signals, performing digital beamforming of one or more signals digital beams corresponding to the pre-coded first portion of the signals based on the assigned resources, and performing analog beamforming of the digitized pre-coded first portion of the signals to generate one or more analog signal beams for transmission by at least one antenna.

In some implementations, the performing of the digital beamforming can include performing wideband pre-coding of the first portion of the signals. Further, the performing of the digital beamforming can include generating the digital beams and combining the digital beams to generate one or more combined digital beams.

In some implementations, at least one antenna can include one or more antenna sub-arrays. Each antenna sub-array can generate one or more beams for transmission of the signals using a beamforming matrix between one or more antenna sub-arrays.

In some implementations, the base station can include at least one of the following: an eNodeB base station, a gNodeB base station, and any combination thereof. At least one of the first portion and the second portion of the base station can include at least one of the following: a radio transmitter and a radio receiver. The base station can be a base station operating in at least one of the following communications systems: a long term evolution communications system and a new radio communications system.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1b illustrates further detail of the exemplary LTE system shown in FIG. 1a;

FIG. 1c illustrates additional detail of the evolved packet core of the exemplary LTE system shown in FIG. 1a;

FIG. 1d illustrates an exemplary evolved Node B of the exemplary LTE system shown in FIG. 1a;

FIG. 7 is a chart illustrating comparison of various options for implementing a pre-coder;

DETAILED DESCRIPTION

The current subject matter can provide for systems and methods that can be implemented in layer 1 split architecture for wireless communications systems. Such systems can include long term evolution wireless communications systems and/or New Radio communications systems. The current subject matter incorporates use of a multiple input, multiple output ("MIMO") techniques along with hybrid analog/digital beamforming in a layer 1 split architecture. A centralized upper physical ("PHY") layer processing can be implemented. Layer 1 can be split and frequency-domain compression can be implemented (such as, for example, to reduce bandwidth). Signals from user equipment(s) can be received from multiple sites.

One or more aspects of the current subject matter can be incorporated into transmitter and/or receiver components of base stations in such communications systems. An exemplary long-term evolution communications system is described below.

I. Long Term Evolution Communications System

FIGS. 1a-c and 2 illustrate an exemplary conventional long-term evolution ("LTE") communication system 100 along with its various components. An LTE system or a 4G LTE, as it is commercially known, is governed by a standard for wireless communication of high-speed data for mobile telephones and data terminals. The standard is based on the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard is developed by the 3GPP ("3rd Generation Partnership Project").

Figure 1A:
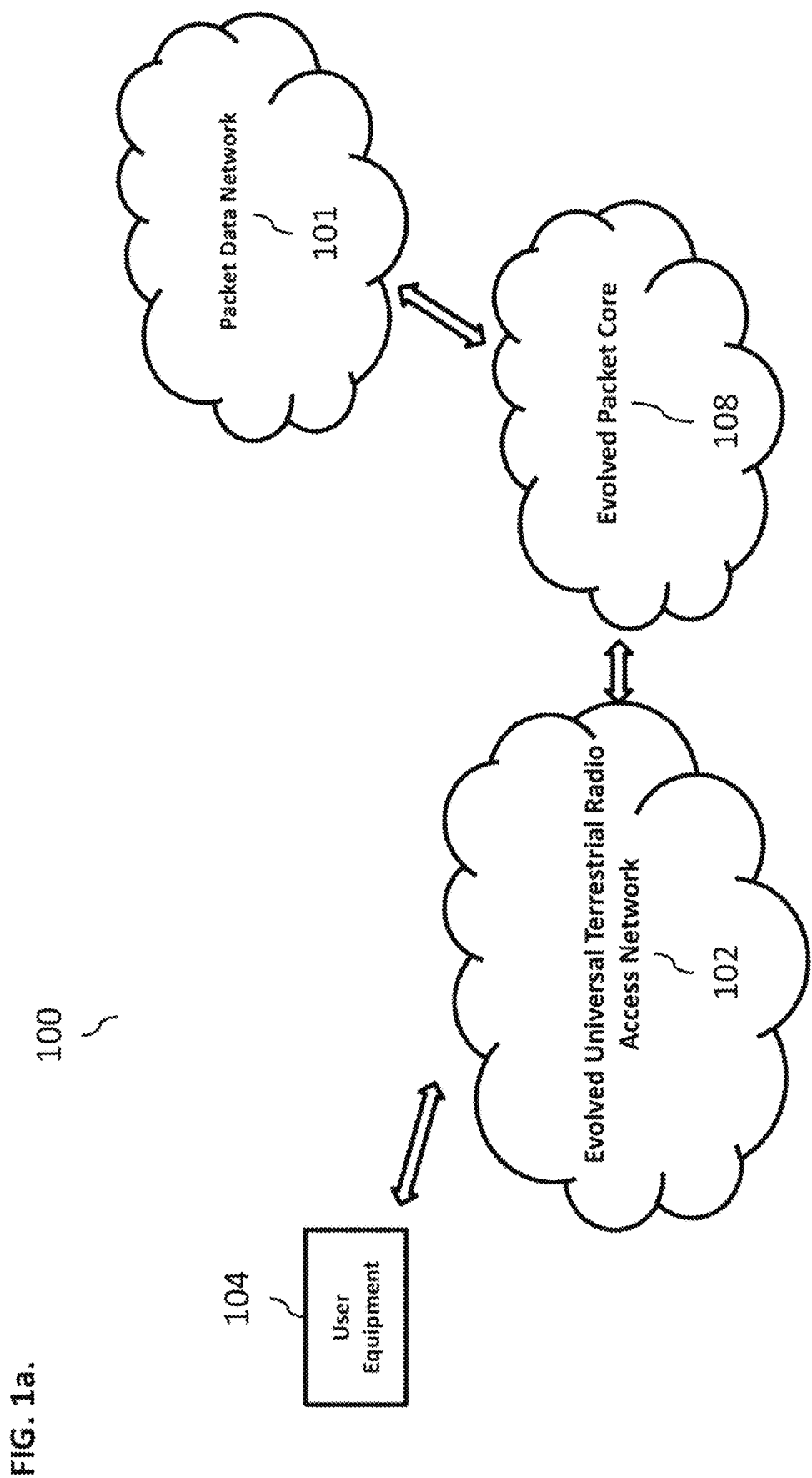
FIG. 1a illustrates an exemplary conventional long term evolution ("LTE") communications system.
Figure 1B:
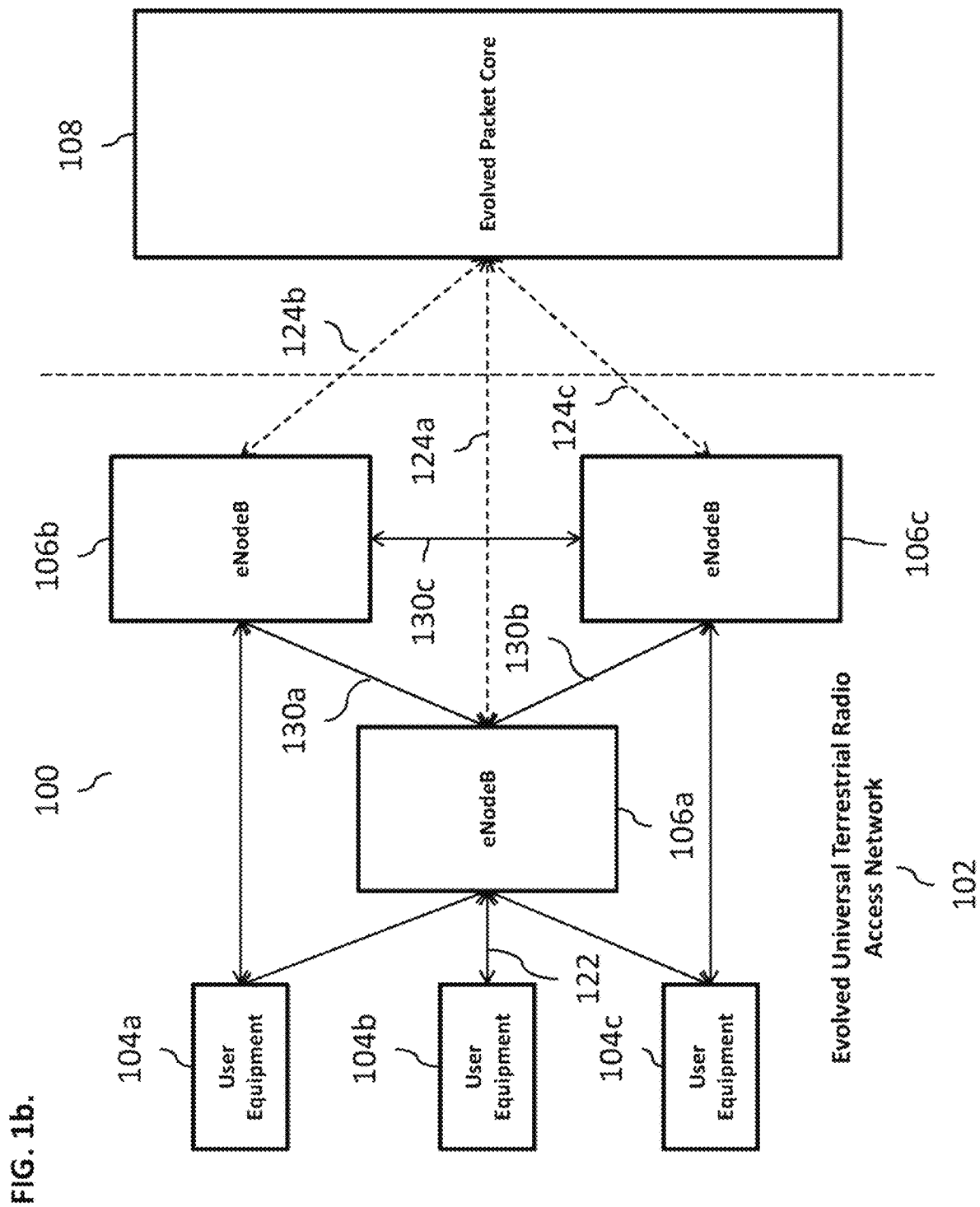

As shown in FIG. 1a, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106(a, b, c) (as shown in FIG. 1b) that provide communication capabilities to a plurality of user equipment 104(a, b, c). The user equipment 104 can be a mobile telephone, a smartphone, a tablet, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1C:
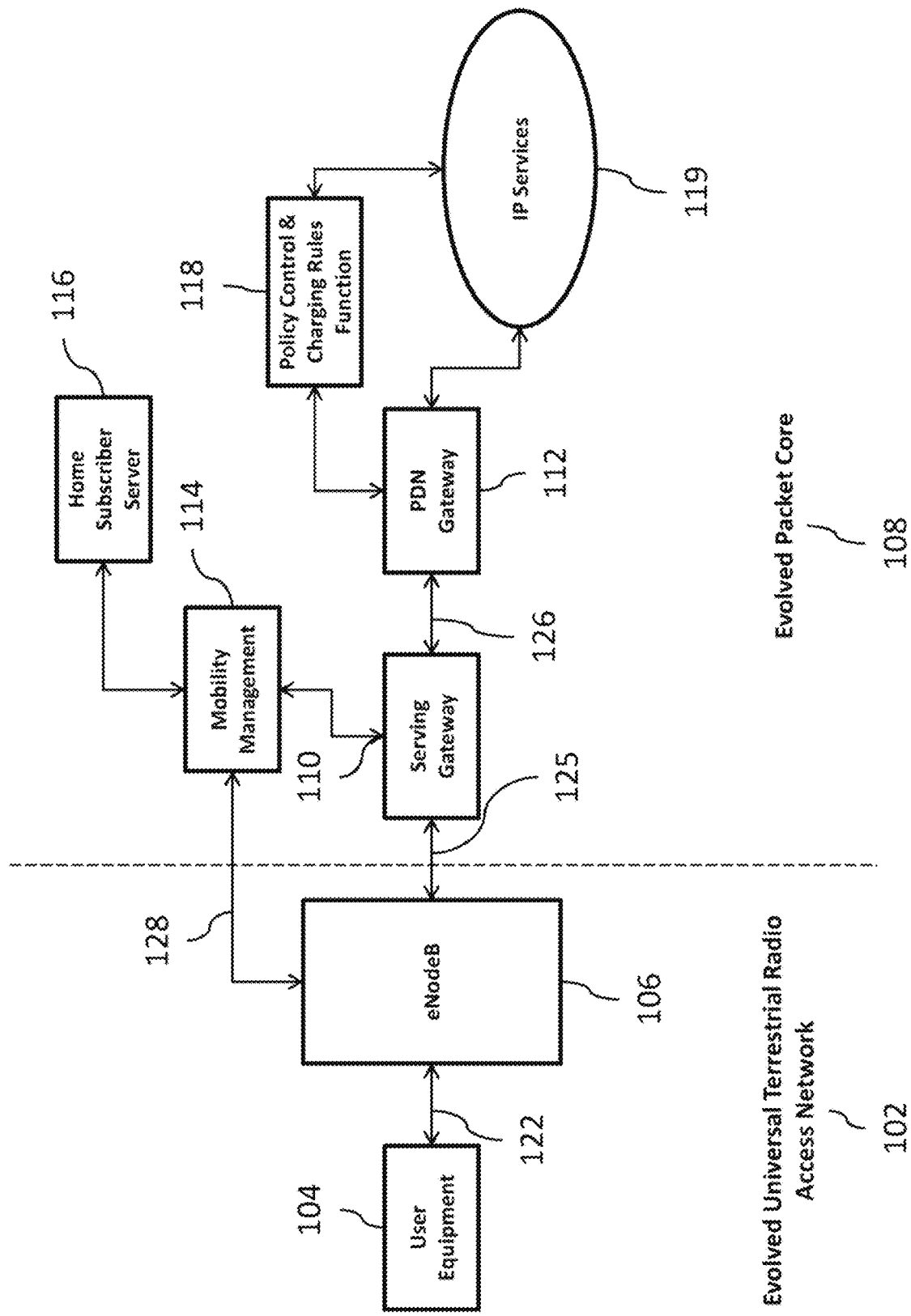

FIG. 1b illustrates further detail of the network 100 shown in FIG. 1a. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMEs, as shown in FIG. 1c) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 1b, the air interface 122 provides communication between user equipment 104b and the eNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1c). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(a, b, c). As shown in FIG. 1a, X2 interface 130a provides interconnection between eNodeB 106a and eNodeB 106b; X2 interface 130b provides interconnection between eNodeB 106a and eNodeB 106c; and X2 interface 130c provides interconnection between eNodeB 106b and eNodeB 106c. The X2 interface can be established between two eNodeBs in order to provide an exchange of signals, which can include a load- or interference-related information as well as handover-related information. The eNodeBs 106 communicate with the evolved packet core 108 via an S1 interface 124(a, b, c). The S1 interface 124 can be split into two interfaces: one for the control plane (shown as control plane interface (S1-MME interface) 128 in FIG. 1c) and the other for the user plane (shown as user plane interface (S1-U interface) 125 in FIG. 1c).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to interwork with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1c. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1a). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QoS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1a).

II. eNodeB

Figure 1D:
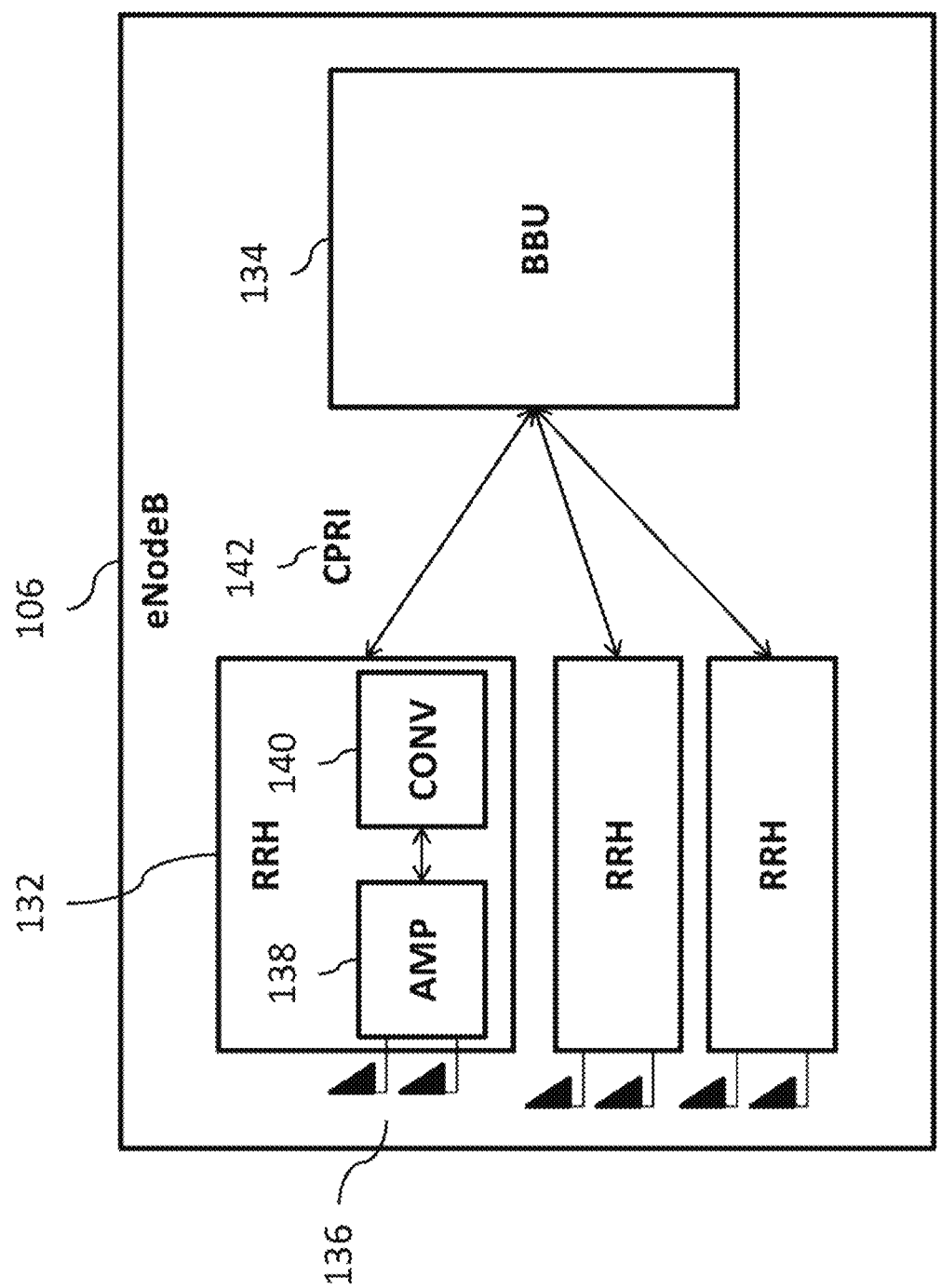

FIG. 1d illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI") 142 standard specification. The operation of the eNodeB 106 can be characterized using the following standard parameters (and specifications): radio frequency band (Band4, Band9, Band17), bandwidth (5, 10, 15, 20 MHz), access scheme (downlink: OFDMA; uplink: SC-OFDMA), antenna technology (downlink: 2×2 MIMO; uplink: 1×2 single input multiple output ("SIMO")), number of sectors (6 maximum), maximum transmission power (60 W), maximum transmission rate (downlink: 150 Mb/s; uplink: 50 Mb/s), S1/X2 interface (1000 Base-SX, 1000 Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1d) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1d). Conversely, the RF signals that are received from user equipment 104 are amplified (using AMP 138) and converted (using CONV 140) to digital baseband signals for transmission to the BBU 134.

Figure 2:
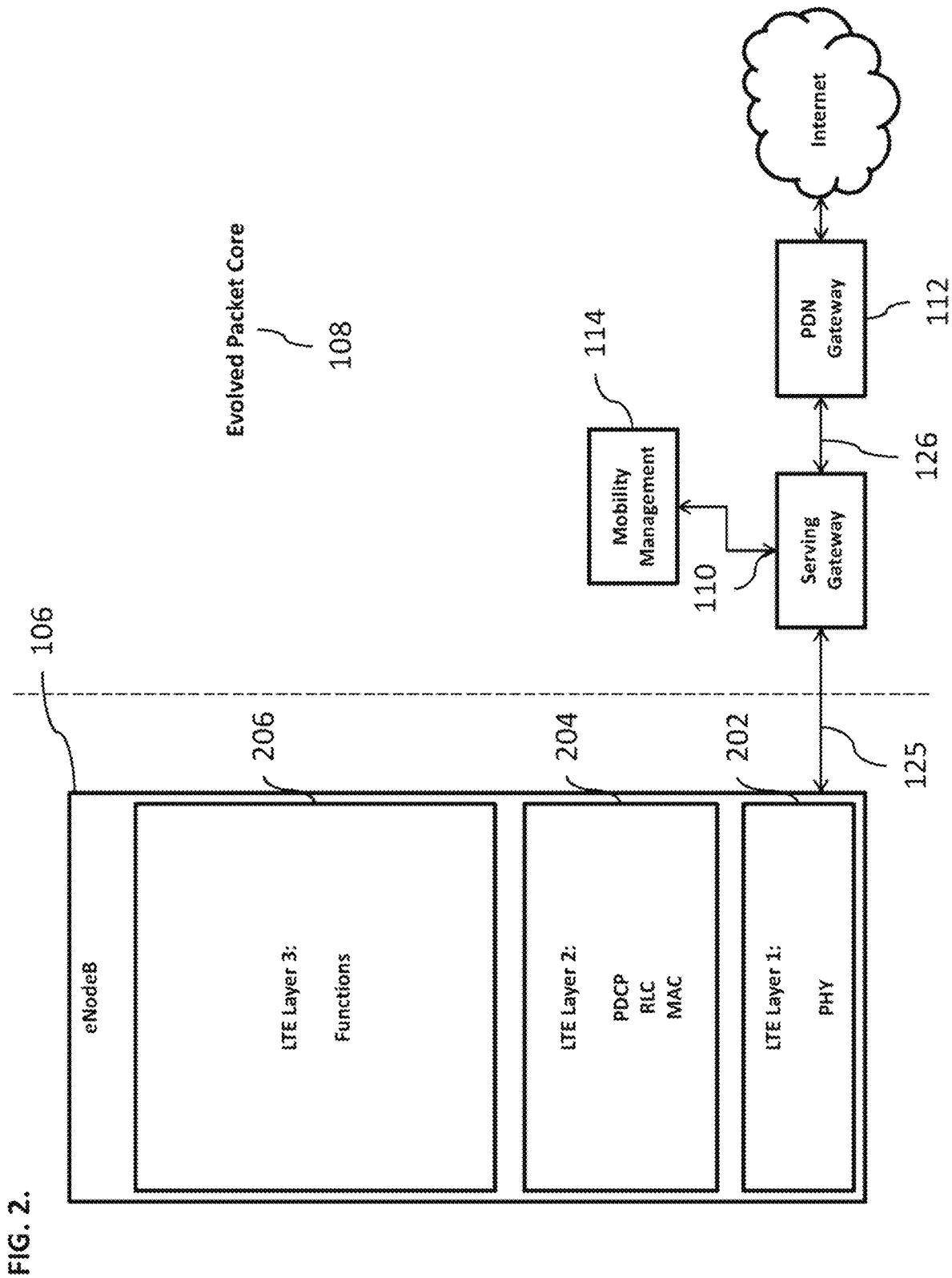
FIG. 2 illustrates further detail of an evolved Node B shown in FIGS. 1a-d.

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1d, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMEs and S-GWs. The eNodeB 106 selects an MME from a group of MMEs so the load can be shared by multiple MMEs to avoid congestion.

III. Layer 1 Split Architecture Wireless Communications Networks

In some implementations, the current subject matter relates to a 5G new radio ("NR") communications system. The 5G NR is a proposed next telecommunications standard beyond the current 4G/IMT-Advanced standards. 5G networks are planned to offer at higher capacity than current 4G, allow higher number of mobile broadband users per area unit, and allow consumption of higher and/or unlimited data quantities in gigabyte per month and user. This can allow users to stream high-definition media many hours per day using mobile devices, even when not Wi-Fi networks. 5G networks are planned to have an improved support of device-to-device communication, lower cost, lower latency than 4G equipment and lower battery consumption, etc. Such networks are planned to have data rates of tens of megabits per second for a large number of users, data rates of 100 Mb/s for metropolitan areas, 1 Gb/s simultaneously to users within a confined area (e.g., office floor), a large number of simultaneous connections for wireless sensor networks, an enhanced spectral efficiency, improved coverage, enhanced signaling efficiency, 1-10 ms latency, reduced latency compared to existing systems.

In some implementations, the current subject matter can provide a unified architecture for 3.5 GHz solution and mmWave New Radio communications systems. The current subject matter can further allow for reuse of LTE uplink for transmission of NR Network and Service Analyzer ("NSA") operation and can support tight inter-working between LTE and NR components/systems. The current subject matter can provide a PHY-layer-split architecture with frequency-domain symbol transfer in the fronthaul communications, frequency-domain compression with statistical multiplexing gain, cell/sector, loading (physical resource block ("PRB") usage), MIMO layers and modulation coding scheme ("MCS"). Moreover, the current subject matter can allow for hybrid analog beamforming ("BF") and digital precoding, active antenna system ("AAS") for coverage extension, and digital precoding for MIMO (including distributed MIMO for cell edge throughput improvement).

Figure 3:
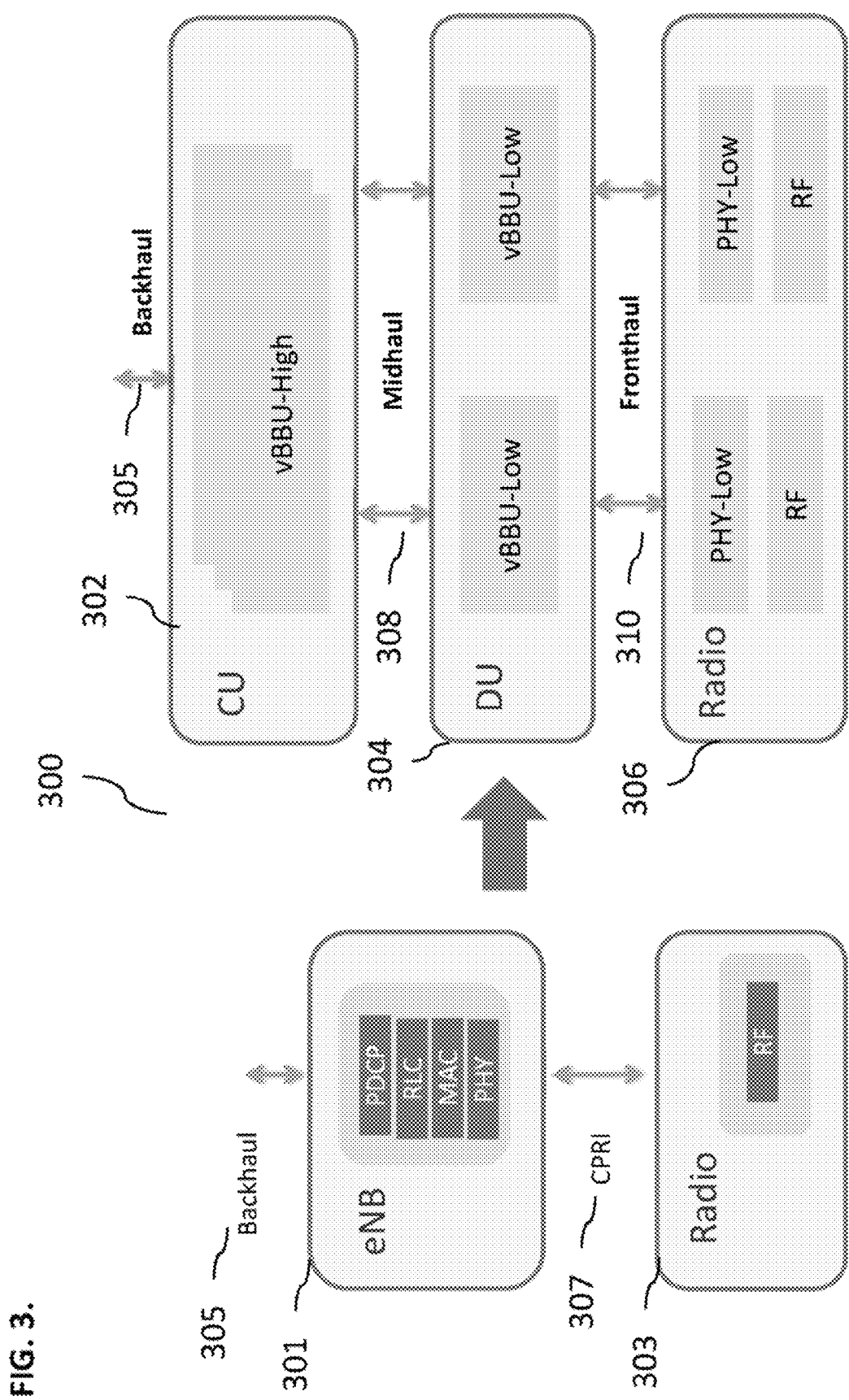
FIG. 3 illustrates an exemplary virtual radio access network, according to some implementations of the current subject matter.

FIG. 3 illustrates an exemplary virtual radio access network 300, according to some implementations of the current subject matter. The network 300 can provide communications between various components, including a base station (e.g., eNodeB) 301, a radio equipment 307, a centralized unit 302, a digital unit 304, and a radio device 306. The components in the system 300 can be communicatively coupled to an evolved packet core using a backhaul link 305. A centralized unit ("CU") 302 or vBBU-high can be communicatively coupled to a digital unit ("DU") 304 or vBBU-low using a midhaul connection 308. The radio frequency ("RF") components 306 can be communicatively coupled to the DU 304 using a fronthaul connection 310.

In some implementations, the vBBU high unit 302 can provide intelligent communication capabilities to one or more vBBU low units 308. The units 302, 304 can include one or more base stations, macro base stations, micro base stations, remote radio heads, etc. and/or any combination thereof.

Figure 4:
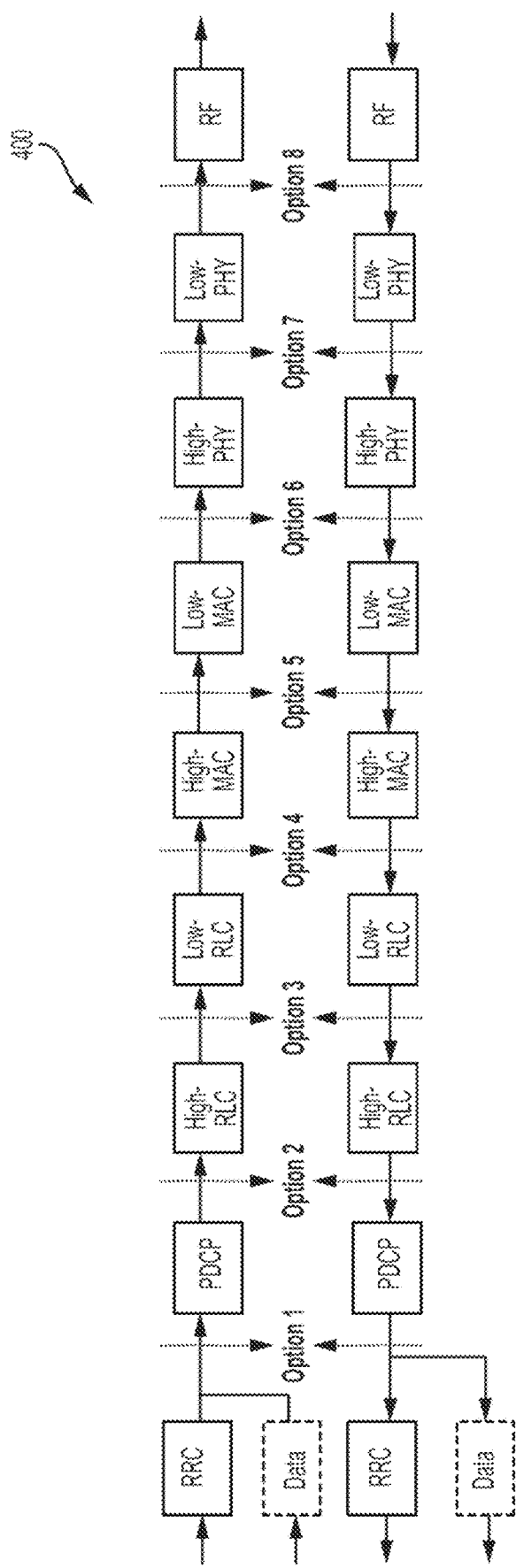
FIG. 4 illustrates an exemplary 3GPP split architecture.

FIG. 4 illustrates an exemplary 3GPP split architecture 400. According to this architecture, the CPRI bandwidth requirement for NR can be 100s of Gb/s. CPRI compression can be implemented in the DU and RU (as shown in FIG. 3). Further, various algorithms can be implemented to prevent multi-vendor operation. The architecture 400 can allow for standardization of fronthaul/midhaul, which can include a higher layer split (e.g., Option 2 or Option 3-1 (Upper/Lower RLC split architecture)) and fronthaul with L1-split architecture (Option 7), as discussed below.

In some implementations, the current subject matter's L1-split architecture (i.e., Option 7 as shown in FIG. 4) can include an advanced receiver in the uplink, joint processing across multiple transmission points (TPs) for both DL/UL, and reasonable transport bandwidth and latency requirements for ease of deployment. Further, the current subject matter's L1-spit architecture can include a split between cell-level and user-level processing, which can include cell-level processing in remote unit ("RU") and user-level processing in DU. Further, using the current subject matter's L1-split architecture, frequency-domain samples can be transported via Ethernet fronthaul, where the frequency-domain samples can be compressed for reduced fronthaul bandwidth.

Figure 5A:
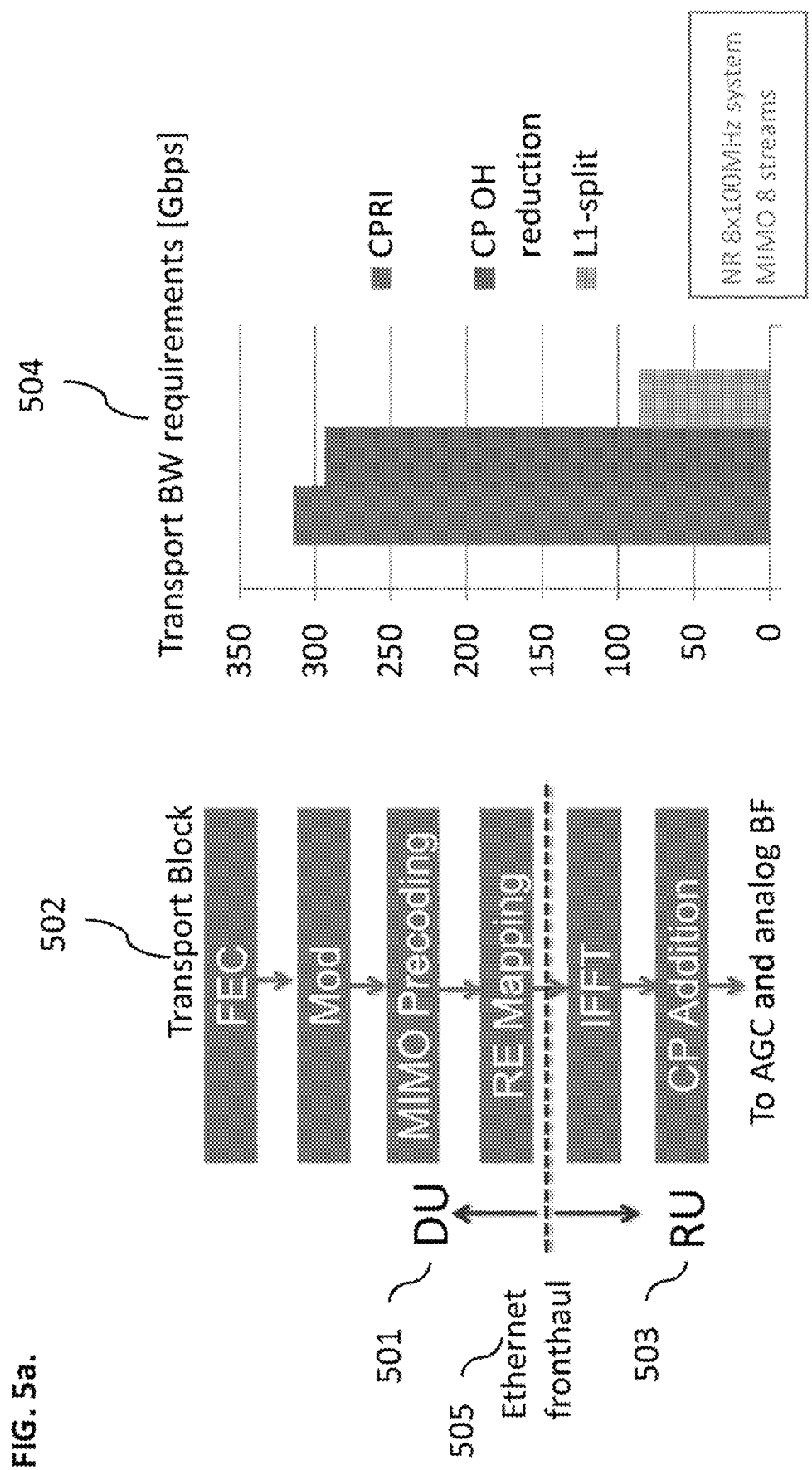
FIG. 5a illustrates an exemplary L1-split architecture along with a comparison plot showing reduced transport bandwidth requirements of the architecture, according to some implementations of the current subject matter.

FIG. 5a illustrates an exemplary L1-split architecture 502 along with a comparison plot 504 showing reduced transport bandwidth requirements of the architecture 502, according to some implementations of the current subject matter. The architecture 502 can include a digital unit ("DU") 501 communicatively coupled to a remote unit ("RU") 503 via Ethernet fronthaul 505. The DU unit can include a forward error correction ("FEC") component, a modulation ("Mod") component, a MIMO precoding component, and resource element ("RE") mapping component. The RU unit 503 can include an inverse fast Fourier transform ("IFFT") component, and cyclic prefix ("CP") addition component. The architecture 502 can achieve a significant reduction in fronthaul bandwidth by statistical multiplexing of cells (carrier and sector), loading (PRB usage), and/or MIMO layers and MCS (QPSK/64 QAM/256 QAM).

Figure 5B:
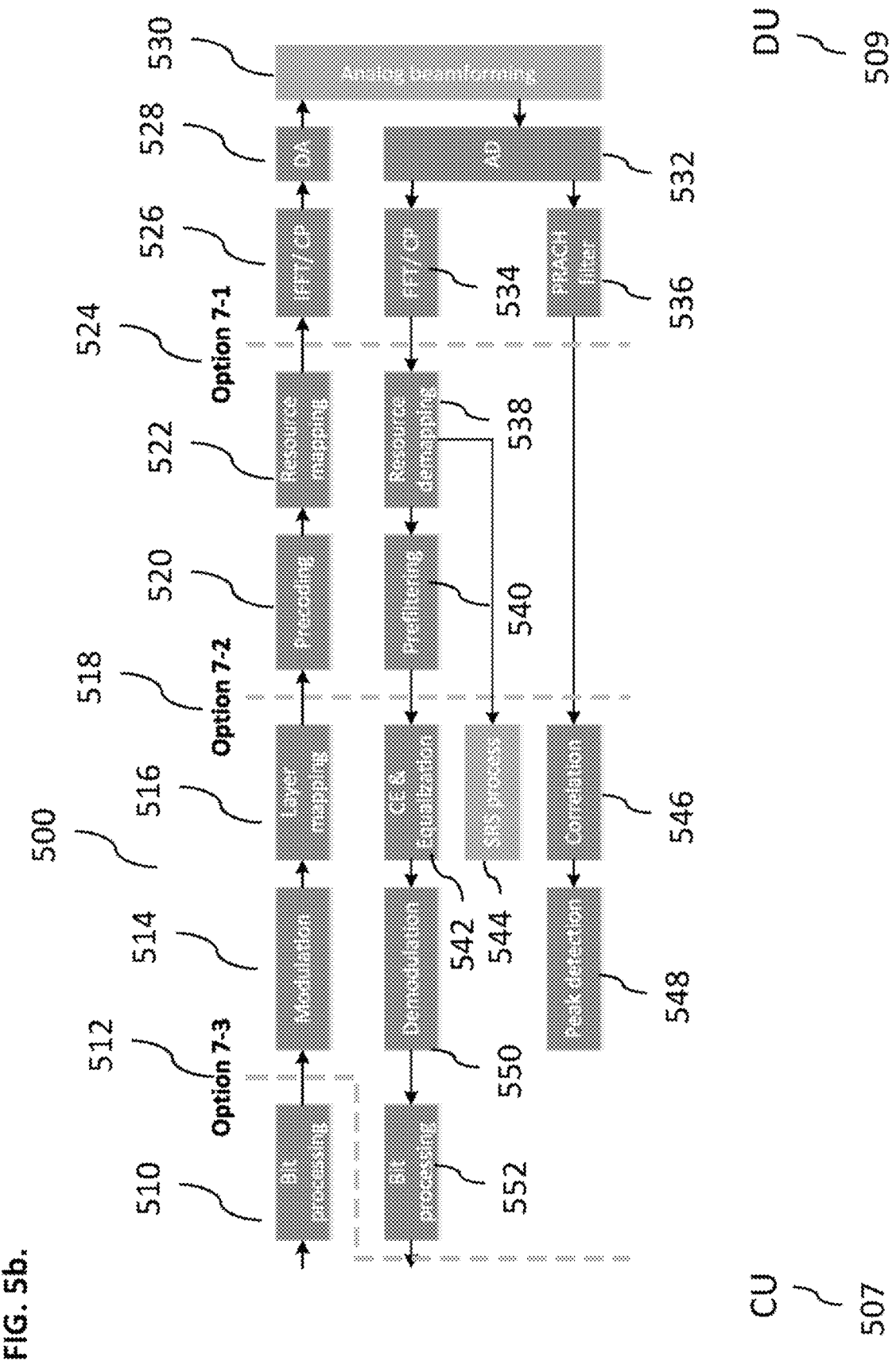
FIG. 5b illustrates an exemplary lower layer split architecture.

FIG. 5b illustrates an exemplary lower layer split architecture 500. The architecture 500 can implement an Option 7-1, where some functionalities of the lower PHY layer (e.g., FFT/iFFT and CP addition/removal) can be performed by the digital unit 509 while the remaining functions of the PHY layer can be performed by the centralized unit 507. Additionally, Option 7-2 can be implemented for the purposes of pre-coding and beamforming in the digital unit 509.

As shown in FIG. 5b, the centralized unit 507 can perform bit processing 510, which can be followed by modulation 514 and layer mapping 516. Option 7-2 can be utilized, where the digital unit 509 can perform pre-coding 520 and resource mapping 522. Prior to performing analog beamforming 530, the digital unit 509 can apply IFFT/CP removal 526 and use digital-to-analog converter 528 to convert digital signals to analog for the purposes of beamforming. Option 7-1 can provide while having a high fronthaul bandwidth, can provide for lower digital unit complexity, sub-millisecond fronthaul latency requirement, no additional overhead in pre-coding, and CoMP/Multi-site MIMO parameters can be determined based on channel state information feedback received in the digital unit.

In the reverse path, analog signals can be converted using an analog-to-digital converter 532 in the digital unit 509. The digital unit 509 can perform FFT/CP addition 534, which is followed by resource de-mapping 538 and pre-filtering 540. Subsequent to de-mapping 538, the centralized unit 507 can perform sound reference signal (SRS) processes 544. Coverage enhancement (CE) and equalization processes 542 can be performed after receiving pre-filtered data from pre-filtering component 540. The centralized unit 507 can then perform demodulation 550 followed by bit processing 552. Additionally, the centralized unit 507 can also correlate any signals that it receives from the Physical Random Access Channel (PRACH) filter component 536 of the digital unit 509. The centralized unit 507 can further use its peak detection component 548 to determine peaks.

Figure 5C:
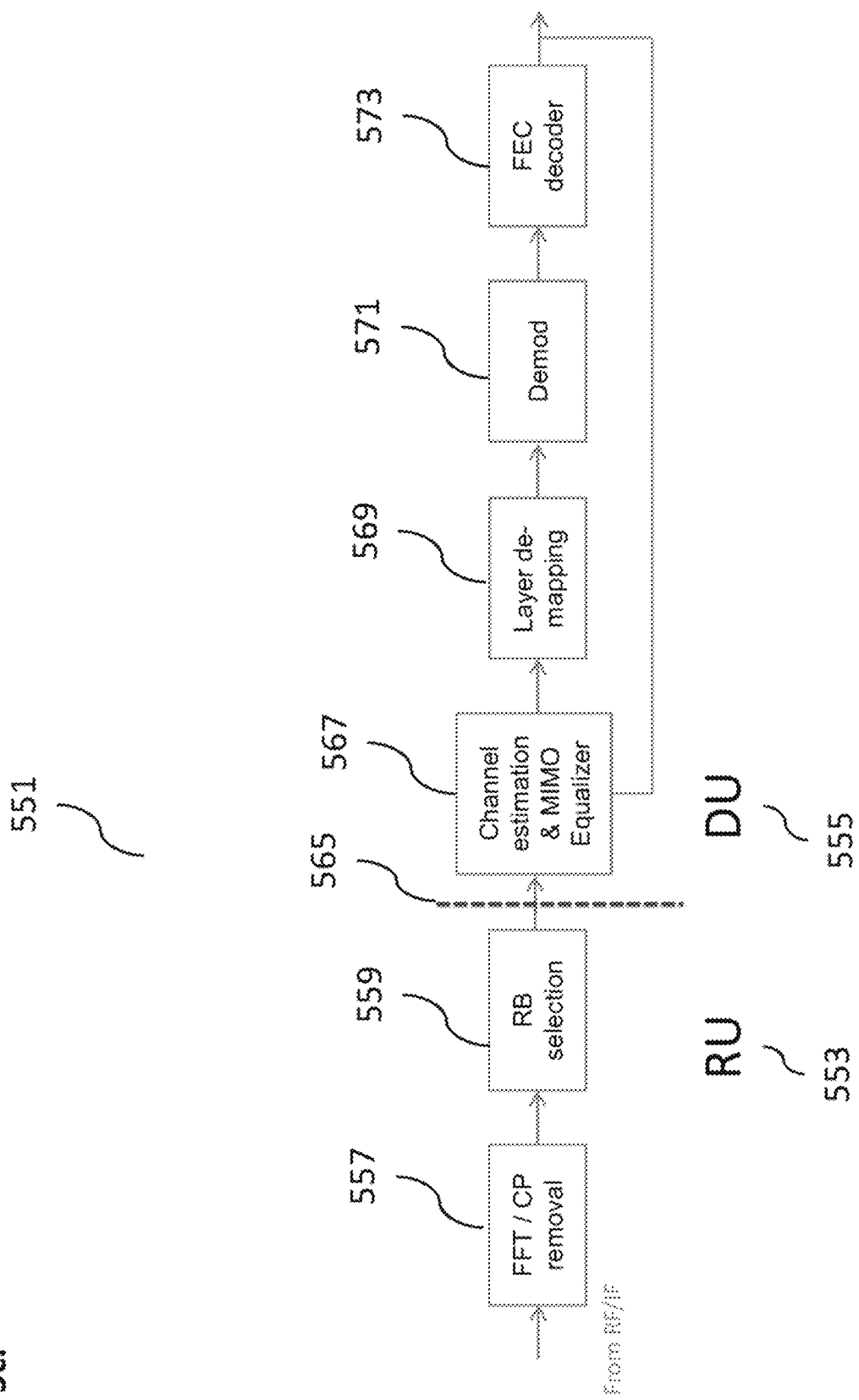
FIG. 5c illustrates an exemplary L1-split architecture for an uplink, according to some implementations of the current subject matter.

FIG. 5c illustrates an exemplary L1-split architecture 551 for an uplink (as L-1 split 565), according to some implementations of the current subject matter. As shown in FIG. 5c, a remote unit 553 can be communicatively coupled to a digital unit 555 via a connection 565. The remote unit 553 and digital unit 555 can be configured to split various functionalities associated with layer L1 over the connection 565.

In some implementations, the remote unite 553 can be configured to receive RF/IF signals (e.g., from user equipments, other RUs, and/or any other devices). Upon receipt of the RF/IF signals, the remote unit 553 can be configured to process the signals using a FFT/CP (Fast Fourier Transform/ Cyclic Prefix) removal component 557, and perform selection/assignment of resource blocks using its RB selection component 559.

The digital unit 555 can include a channel estimation and MIMO equalizer component 567, a layer de-mapping component 569, demodulation component 571, and a forward error correction (FEC) decoder component 573. The architecture 551 can allow use of an advanced receiver (e.g., SIC, Turbo equalizer, etc.) in the digital unit 555. In a centralized digital unit implementation, multi-site joint reception can be achieved using the digital unit 555 without inter-eNB data sharing. Further, compression can be applied in the remote unit 553 to further reduce fronthaul bandwidth.

Figure 5D:
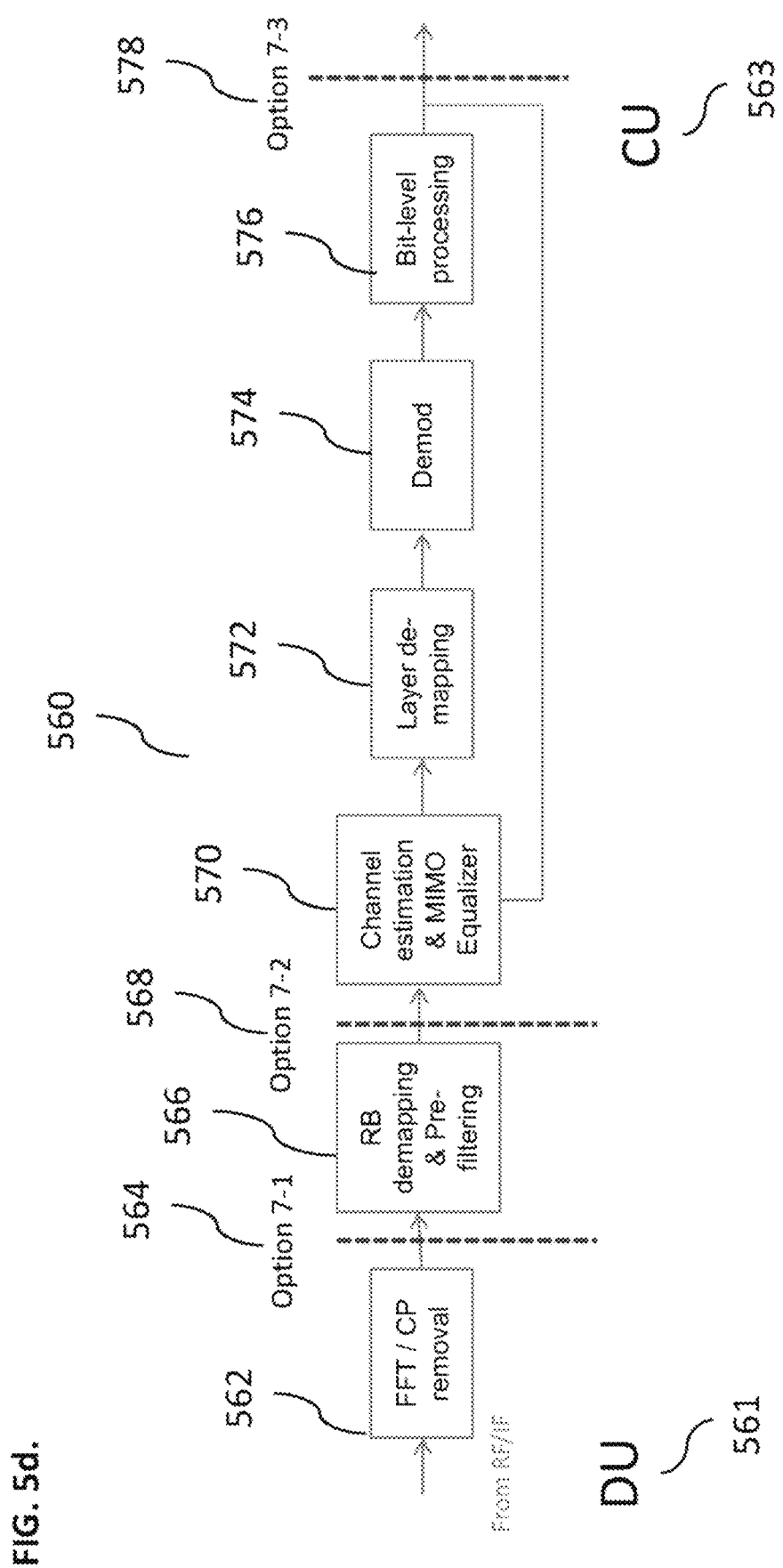
FIG. 5d illustrates exemplary functionalities performed during an uplink communication in an exemplary lower layer split architecture, according to some implementations of the current subject matter.

FIG. 5d illustrates exemplary functionalities performed during an uplink communication in an exemplary lower layer split architecture 560, according to some implementations of the current subject matter. The architecture 560 can include a digital unit 561 communicatively coupled to a centralized unit 563. Option 7-1 564, Option 7-2 568, and Option 7-3 578 can be implemented in the architecture 560. Options 7-1 and 7-2 can provide for advanced receiver functions in the centralized unit 563 (e.g., SIC, Turbo equalizer, etc.). Moreover, using these options, multi-site joint reception is possible in the centralized unit 563 without inter-nodeB data sharing. Additionally, Option 7-1 with layer compression can further reduce fronthaul bandwidth, whereas Option 7-3 requires low-latency, high bandwidth fronthaul.

Similar to FIG. 5c, during an uplink communication, the digital unit 561 of the architecture 560 shown in FIG. 5 can perform removal of FFT/CP using its FFT/CP removal component 562, which can be followed by resource block de-mapping and pre-filtering functions in the component 566 (similar to those shown in FIG. 5b). The centralized unit 563 can perform channel estimation and MIMO equalization (using its component 570), layer de-mapping (using its component 572), demodulation (using component 574), and bit level processing (using component 576).

Figure 6A:
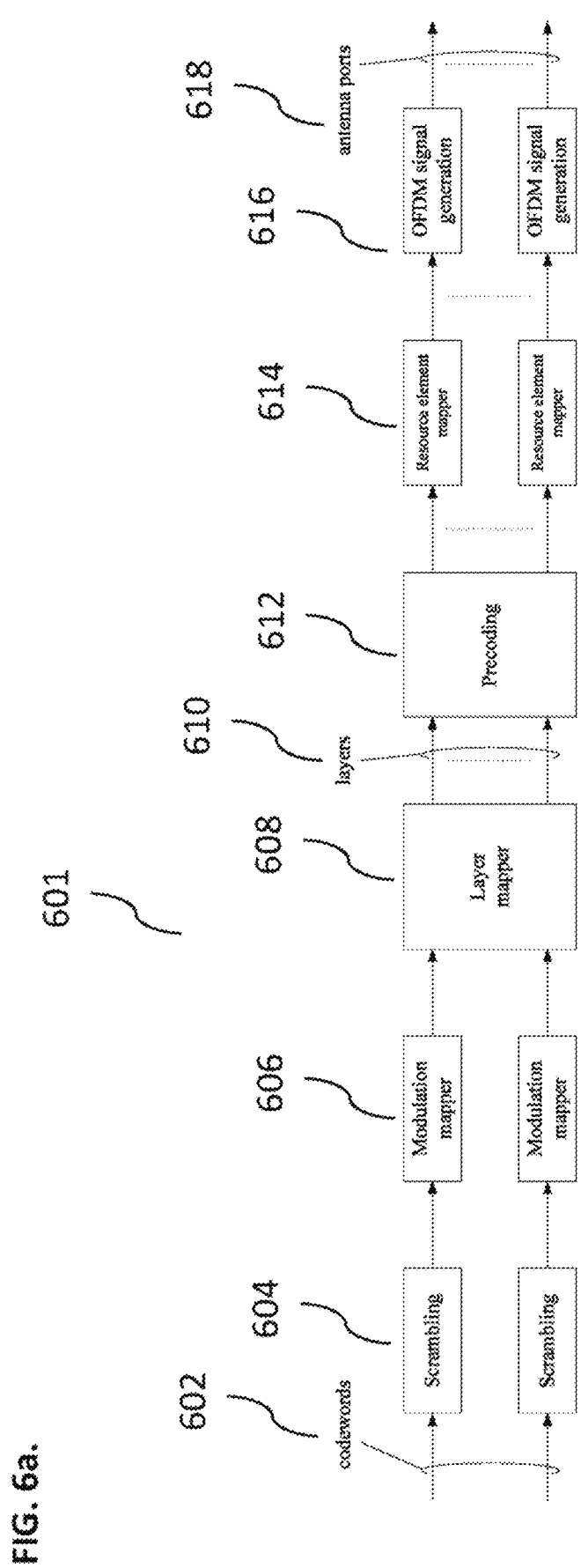
FIG. 6a illustrates another exemplary beamforming architecture for a wireless communication system.

FIG. 6a illustrates hybrid beamforming architecture options 600(A, B, C) at a base station in a wireless communication system for the purposes of downlink transmissions. Beamforming can refer to processing of signals for directional signal transmission or reception. This can be achieved by combining elements in an antenna in such a way that signals at particular angles experience constructive interference while others—destructive interference. Beamforming can be used for transmission and receiving to achieve spatial selectivity. In wireless communications, there are two classes of beamforming: a direction of arrival beamforming (e.g., adjustment of receive or transmit antenna direction), and eigen beamforming (e.g., maximization of signal power at the receive antenna based on various criteria). To maximize throughput of multi-layer antenna systems, precoding is used for multi-layer beamforming, where precoding can be a beamforming scheme to support multi-layer transmission in a MIMO system. Using precoding, multiple streams cab be transmitted from an antenna using independent weights per antenna to maximize throughput at the receiver output.

FIG. 6a illustrates another exemplary beamforming architecture 601 for a wireless communication system. The architecture 601 is referenced in the 3GPP Standard, LTE Releases 10-11. The architecture 601 can performing scrambling 604 of codewords 602, where the scrambled codewords are passed on to modulation mapper 606 and then to layer mapper 608. The layers 612 are then processed by a precoding component 612. Subsequent to precoding, resource elements can be mapped using a resource element mapper component 614. Then, OFDM signals for transmission to the antenna ports 618 can be generated using components 616.

In this architecture, MIMO pre-coding can be performed in frequency domain after layer mapping. The architecture 601 further has a dual codebook structure that can include spatial multiplexing of 8 layers and cross-polarization antenna support. The dual codebook structure can be represented using the following:

$$W = W_1 W_2 \quad (1)$$

where $W_1$ is a wideband precoding matrix indicator (PMI) representing long-term channel statistics and $W_2$ is a subband PMI for beam selection for each polarization.

Figure 6B:
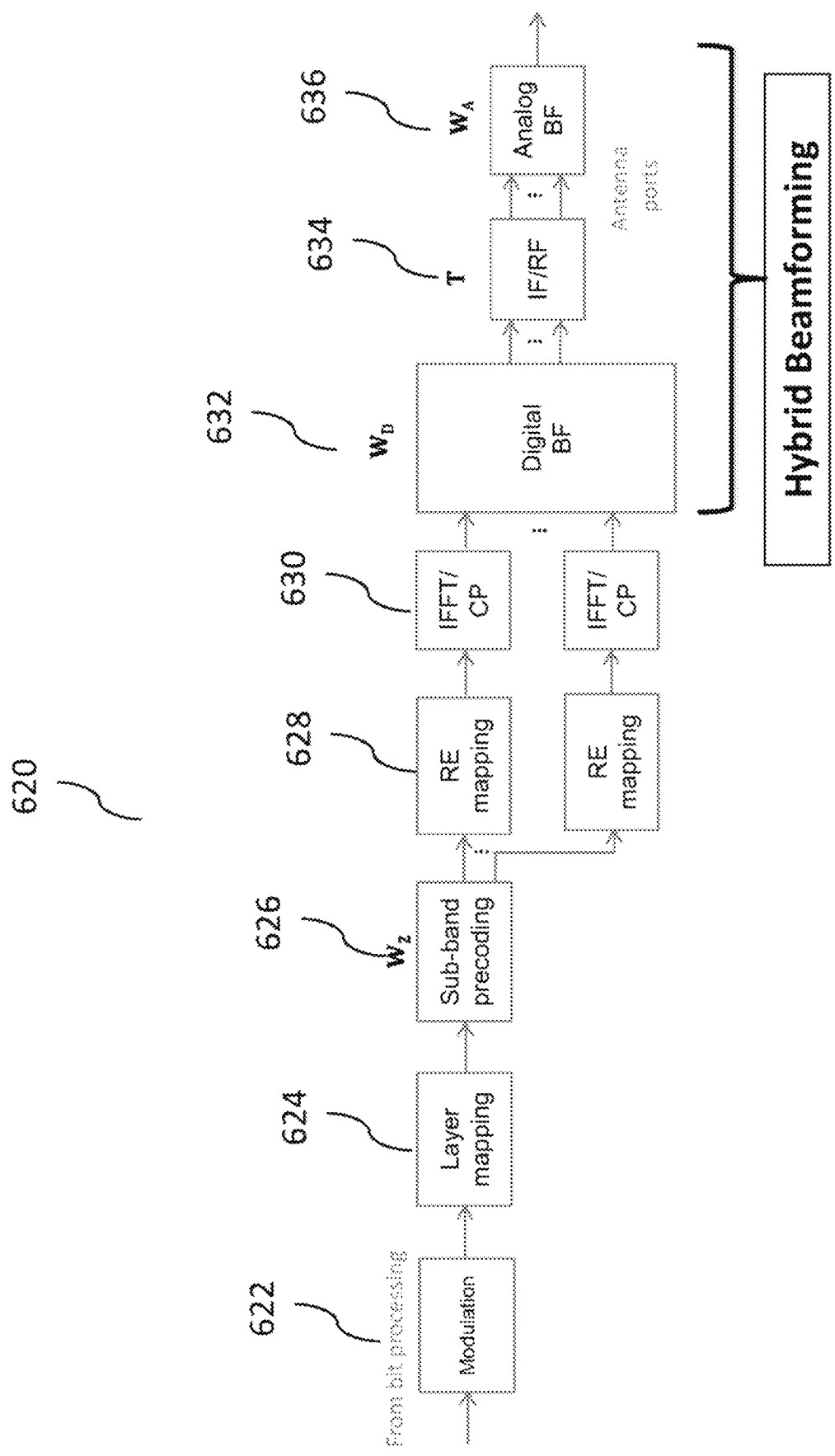
FIG. 6b illustrates an exemplary new radio hybrid beamforming architecture.

FIG. 6b illustrates an exemplary new radio hybrid beamforming architecture 620. The architecture 620 can include a modulation component 622, a layer mapping component 624, a sub-band pre-coding component 626, resource mapping components 628, IFFT/CP components 630, a digital beamforming component 632, IF/RF component 634, and an analog beamforming component 636. Components 632, 634, and 636 can be configured to perform hybrid beamforming. The modulation component 622 can perform modulation of the processed bits that may be received by a centralized unit. Layer mapping of the modulated data can be performed by the component 624. Sub-band precoding can be applied using parameter $W_2$ in the component 626. Resource mapping components 628 can perform mapping of resource in accordance with one or more layers that are eventually passed on to the digital beamformer 632. The digital beamformer 632 (further illustrated in FIG. 6c) can perform wideband precoding along with the IF/RF and analog beamforming components 634, 636. The wideband precoding parameter $W_1$ can be determined using the following:

$$W_1 = W_D T W_A \quad (2)$$

where WD corresponds to digital beamforming matrix parameter in the sub-array, WA correspond to an analog beamforming parameter in the antenna sub-array, and T specifies D/A and/or IF/RF parameters.

Figure 6C:
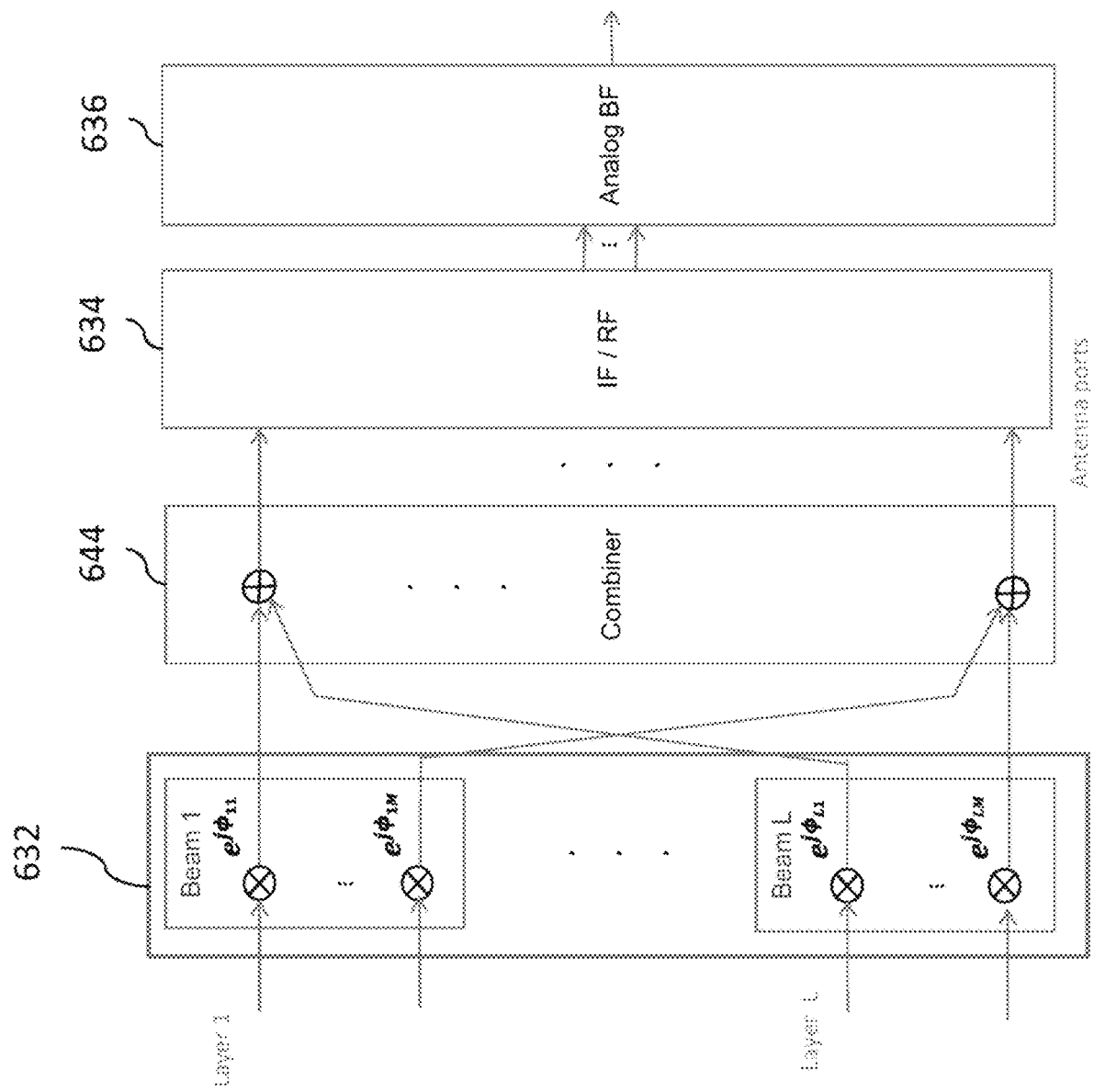
FIG. 6c illustrates additional detail with regard to the beamforming component shown in FIG. 6b.

FIG. 6c illustrates additional detail with regard to the beamforming component 632 shown in FIG. 6b. Data from the IFFT/CP removal components 630 corresponding to a plurality of layers 1, . . . , L can be provided to the digital beamforming component 632 to generate one or more corresponding beams (Beam 1, . . . , Beam L). The beams are then supplied to a combiner 644 for combining one or more the beams. For example, the Butler matrix can be used for the purposes of beam combining/beamforming purposes. As can be understood, other ways of beam-combining/beamforming can be used. Combined beams are then transmitted to IF/RF components 634 and via antenna ports to analog beamforming components 636 to generate beams for transmission.

Figure 6D:
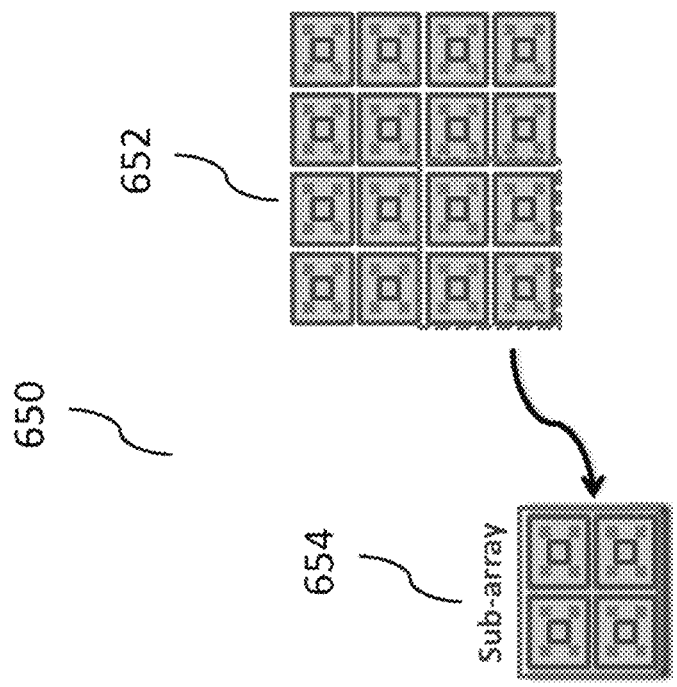
FIG. 6d illustrates an exemplary sub-arrays beamforming array architecture.

FIG. 6d illustrates an exemplary sub-arrays beamforming architecture 650. As shown in FIG. 6d, an exemplary antenna panel 652 can include a plurality of elements (e.g., 8×8 elements). Further, the antenna panel 652 can further include one or more sub-arrays 654. As shown in FIG. 6*d*, the antenna panel can include 4 sub-arrays 654. As described above with regard to FIG. 6*b*, digital precoding can be performed in two steps using the following:

$$W_D = \begin{bmatrix} I & P \\ \Phi & P\Phi \end{bmatrix} \begin{bmatrix} W_{DBF} & 0 \\ 0 & W_{DBF} \end{bmatrix} \text{ for beam forming} \quad (3)$$

$$W_D = \begin{bmatrix} I & I \\ I & I \end{bmatrix} \begin{bmatrix} W_{DBF} & 0 \\ 0 & W_{DBF} \end{bmatrix} \text{ for MU-MIMO} \quad (4)$$

where $W_{DBF}$ represents digital beamforming of sub-array 654; P is a horizontal beamforming matrix between sub-arrays; and $\Phi$ is a vertical beamforming matrix between sub-arrays.

Figure 6E:
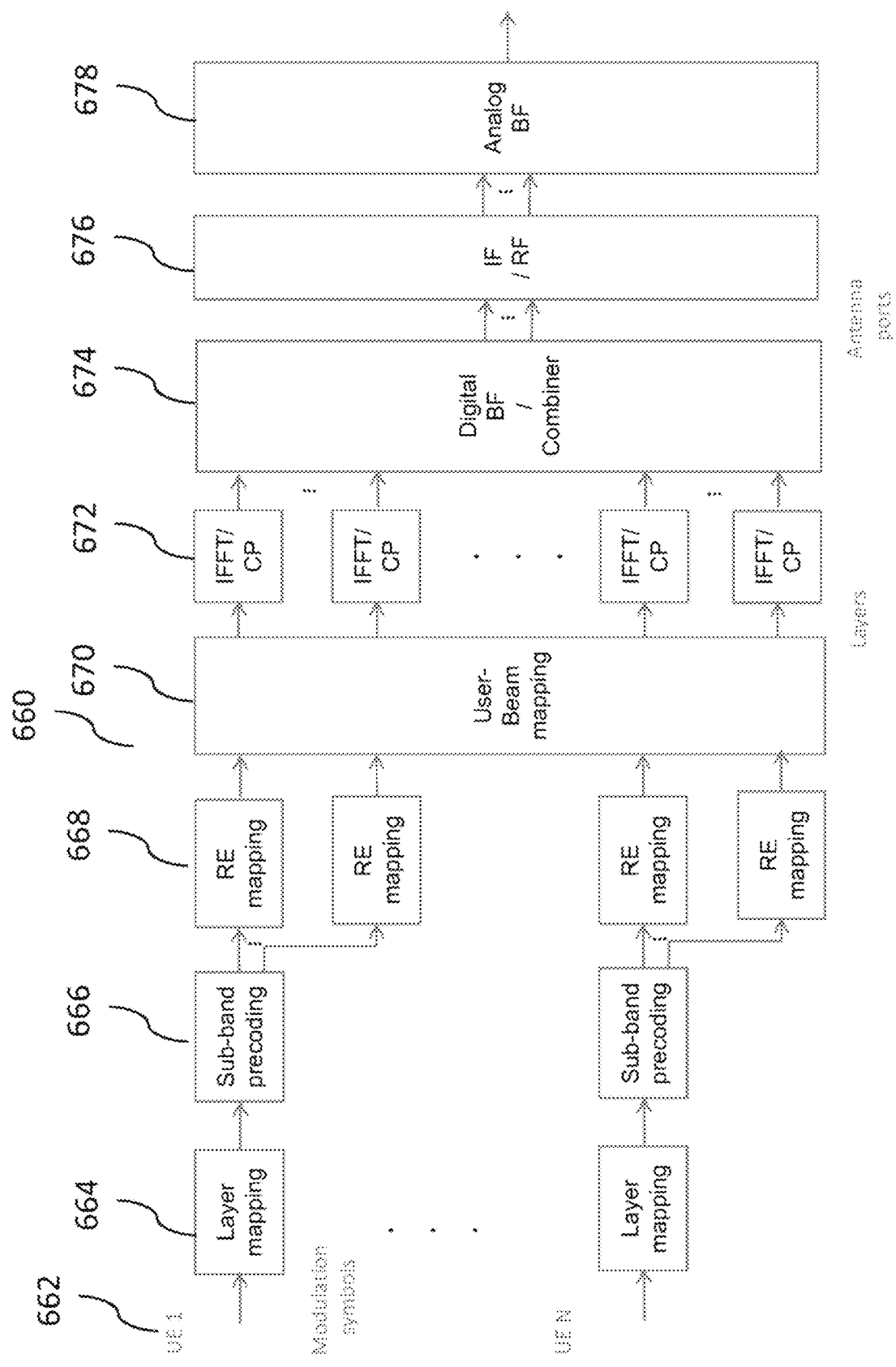
FIG. 6e illustrates an exemplary architecture for new radio hybrid beamforming in the MU-MIMO environment, according to some implementations of the current subject matter.

FIG. 6*e* illustrates an exemplary architecture 660 for new radio hybrid beamforming in the MU-MIMO environment, according to some implementations of the current subject matter. The architecture 660 can be configured to accommodate multi-site/multi-user MIMO, where signals can be received from multiple user equipments (UE 1, . . . UE N) 662. Signals from the UEs 662 (in the form of modulated symbols) can be provided for layer mapping (using components 664) and sub-band precoding can be performed using components 666 (as described above) and resources can be allocated using resource mapping components 668 for transmission to a user-beam mapping component 670. The digital beamformer/combiner component 674 can initiate hybrid beamforming (as described above in connection with FIGS. 6*b-c*) once the IFFT/CP are removed by the components 672. The formed beams are then passed to the IF/RF components 676 in the antenna ports so that analog beamformers 678 can generate transmissions.

Figure 6F:
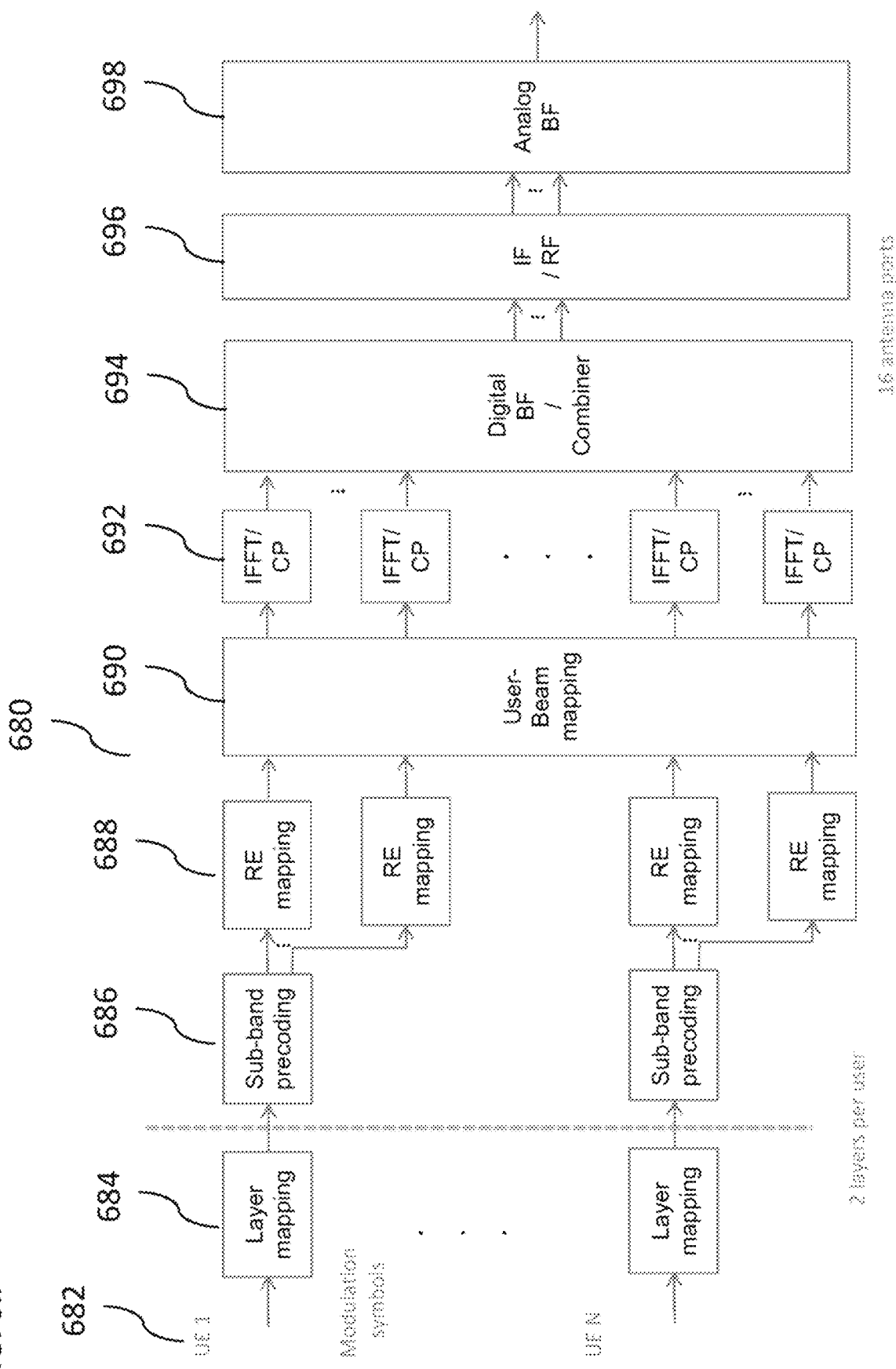
FIG. 6f illustrates an exemplary architecture for new radio hybrid beamforming in the MU-MIMO environment, according to some implementations of the current subject matter.

FIG. 6*f* illustrates an exemplary architecture 680 for new radio hybrid beamforming in the MU-MIMO environment, according to some implementations of the current subject matter. The architecture 680 can implement a lower layer split in accordance with Option 7-2 discussed above. Signals from multiple user equipments (UE 1, . . . UE N) 682 (in the form of modulated symbols) can be provided for layer mapping (using components 684), where 2 layers can be assigned per user in accordance with Option 7-2. Then, sub-band precoding can be performed using components 686 and resources can be allocated using resource mapping components 688 for transmission to a user-beam mapping component 690. By way of a non-limiting example, the user beam mapping component 690 can generate a total of 8 layers, 4 simultaneous beams, and 2×2 MIMO configuration per user. The IFFT/CP can be removed by the components 692 and digital beamformer/combiner component 694 can perform hybrid beamforming (as described above in connection with FIGS. 6*b-c*). The beams can then passed to the IF/RF components 696 in the antenna ports so that analog beamformers 698 can generate transmissions. By way of a non-limiting example, the antennas used in the architecture 680 can include 16 ports, thereby significantly reducing an antenna footprint.

FIG. 7 is a chart 700 illustrating comparison of various pre-coding options. In some cases, pre-coding in DU and RU can be equivalent. For advanced beam-forming/CoMP and multi-site MIMO implementation, precoding in DU can be a preferred approach. As shown in FIG. 7, calculation of a pre-coding vector can be performed locally in the digital unit. However, for calculation of the pre-coding vector in the remote unit, channel state information (CSI) may need to be transmitted from digital unit to the remote unit (which can be affected by transport latency requirements for dynamic transmission time interval (TTI) level pre-coding). Pre-coding vector can be dynamically updated in the digital unit once per transmission time interval. However, in the remote unit, updates to the pre-coding vector depend on transport latency. Channel state information can be used to determine distribute MIMO parameters in the digital unit. However, to determine such parameters in the remote unit, pre-coding vector and various user level data has to be transmitted to the remote unit. Thus, determination of a pre-coding vector in the digital unit may be preferable.

Figure 11:
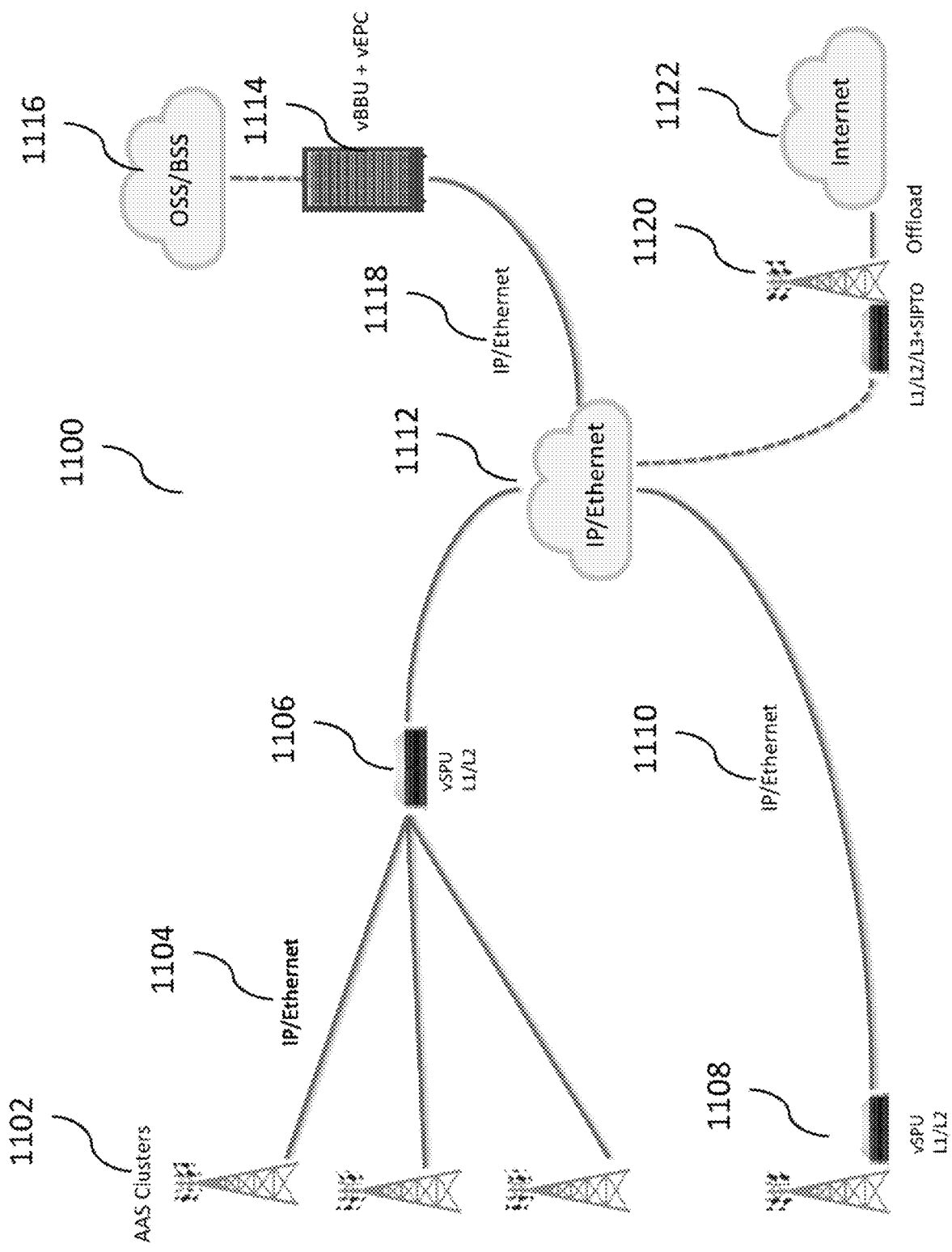
FIG. 11 illustrates an exemplary active antenna system architecture, according to some implementations of the current subject matter.

In some implementations, the current subject matter can provide for an improved active antenna system (AAS) beamforming capabilities for new radio (NR) as well as mmWave beamforming split architecture. This can allow for a unified deployment scenario and flexible inter-working between the two layers. An active antenna can be an antenna that can include active electronic components, where antenna-integrated radio has the RF module positioned next to the passive antenna in order to reduce cable losses. An active antenna can transform traditional antenna to contribute to base station efficiency, which can enable operators to increase capacity and coverage targets of their networks. A base station AAS system (an exemplary system is shown in FIG. 11) can integrate an active transceiver array and a passive antenna array into a single device. In a typical scenario, a remote radio head is connected to an antenna using a radiofrequency cable, as shown in FIG. 2. However, with AAS, a single device with different antenna elements can have their own integrated RF transceivers. As such, the AAS can provide for finer digital control of the beamforming weight of each individual sub-element within the antenna. Moreover, when a MIMO technology is used, radio resources can be utilized in both the micro- and macro-spatial domains.

The AAS can also provide various benefits for multi-dimensional beamforming, such as when user equipments may be located at different elevation points. For example, a user equipment located in at a particular height (e.g., on a top floor of a skyscraper) may require a beam that is pointed upward, whereas a user equipment located on the ground may require a downward directed beam. Use of AAS as well as various MIMO technologies can allow scheduling of these user equipments so as to avoid interferences or any other issues. Use of AAS in 5G systems can also be advantageous as, AAS can provide for combination of multiple antennas, RF, transmitter and receiver lines in a single device, thereby reducing wiring, networking costs, etc. Moreover, the AAS and MIMO technologies can also be beneficial is adapting to individual smaller cells users distribution environments.

Figure 8:
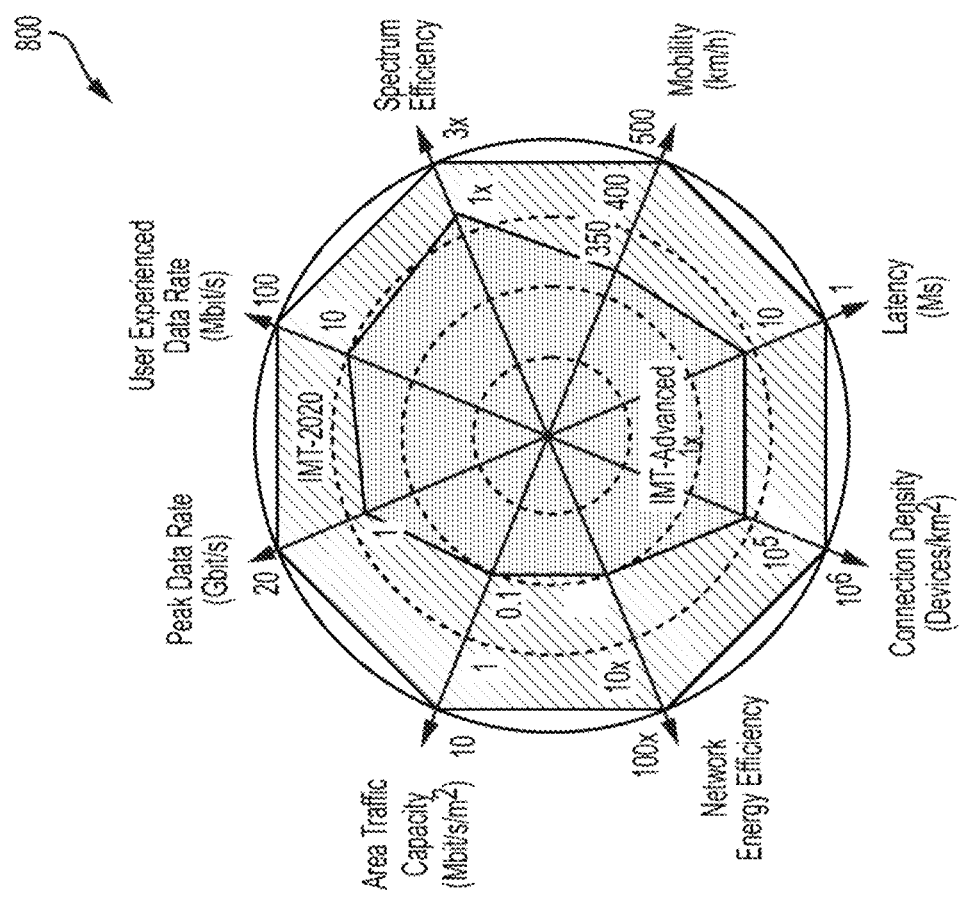
FIG. 8 illustrates a comparison of key capabilities between IMT-Advanced (4G) and IMT-2020 (5G) systems.

FIG. 8 illustrates a comparison 800 of key capabilities between IMT-Advanced (4G) (lighter-shaded in FIG. 8) and IMT-2020 (5G) (darker-shaded area in FIG. 8) systems. The comparison 800 is based on key parameters that include a peak data rate, user experienced data rate, spectrum efficiency, mobility, latency, connection density, network energy efficiency, and area traffic capability.

The IMT-Advanced key capabilities can include up to GHz spectrum for peak throughput, uniform QoE (100 Mbps everywhere), and limited MIMO gain in mmWave. However, as shown in FIG. 8, the 5G systems can offer an improved user experienced data rate (i.e., up to 100 Mbit/s), improved spectrum efficiency (i.e., up to 3 times), improved mobility (i.e., up to 500 km/h), reduced latency (i.e., down to 1 ms), improved connection density, improved network energy efficiency (i.e., up to 100 times), increased area traffic capacity (i.e., up to 10 Mbit/s/m²), and increased peak data rate (i.e., up to 20 Gbit/s).

Figure 9:
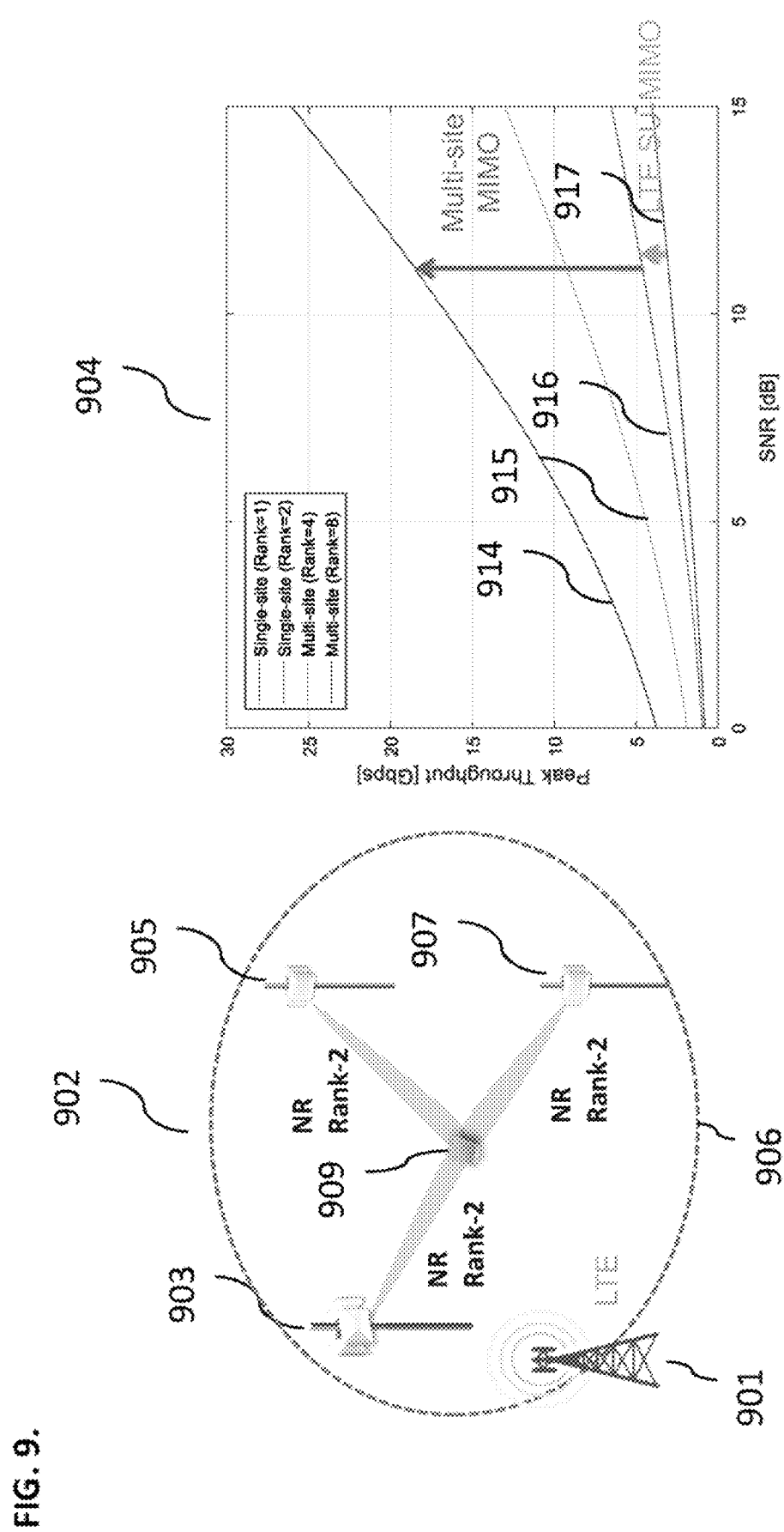
FIG. 9 illustrates an exemplary multi-site MIMO communication system, according to some implementations of the current subject matter.

FIG. 9 illustrates an exemplary multi-site MIMO communication system 902, according to some implementations of the current subject matter. FIG. 9 also shows a comparison plot 904 showing an improvement in peak throughput by the current subject matter's multi-site MIMO system 902.

The system 902 can include a base station (e.g., eNodeB) 901 having a predetermined coverage area 906 and new radio (NR) base stations (e.g., gNodeBs) 903, 905, and 907 that can be located within the coverage area 906. One or more user equipments 909 can also be located within the coverage area 906. The user equipment(s) 909 can be configured to be communicatively coupled with the NR base stations 903, 905, 907. The base stations 903, 905, 907 can be new radio rank 2 base stations. However, as can be understood, the LTE base station (e.g., eNodeB) 901 and base stations 903, 905, 907 can be any other types of base stations. The NR base stations 903, 905, 907 can allow for a hybrid beamforming, as discussed above with regard to FIG. 6. This can include dynamic digital MIMO precoding for multi-site MIMO and AAS for user equipment-specific beamforming.

The plot 904 further illustrates benefits of using a multi-site MIMO system (such as the system 902) over a single-site MIMO system. The single-site or single user MIMO (SU-MIMO) system can refer to point-to-point system that use space-time/space-frequency codes (transmit/receive diversity) together with spatial multiplexing techniques to improve channel capacity and reliability. SU-MIMO systems coordinate processing among all transmitters or receivers. In contrast, in multi-site or multi-user MIMO (MU-MIMO) systems, it is usually assumed that there is no coordination between users. Hence, uplink and downlink MU-MIMO channels can be different. In the uplink, users transmit to the base station over the same channel, where the base station must work to separate the transmitted signals using array processing or multi-user detection methods. In the downlink, the base station uses the same channel to simultaneously transmits to multiple users, which can cause inter-user interference for the users. However, while the signal to noise ratio (SNR) parameter may increase for both the SU-MIMO and MU-MIMO systems, the capacity of the SU-MIMO systems is usually less than the MU-MIMO systems, as shown in FIG. 9. As shown by curves 916 (using rank 2 base stations) and 917 (using rank 1 base stations), the highest peak throughput of SU-MIMO systems is less than approximately 7 Gbps (at the highest SNR) for SU-MIMO 916 system and less than approximately 5 Gbps (at the highest SNR) for SU-MIMO 917. By contrast, MU-MIMO systems have a higher throughput as shown by curves 914 (using rank 8 base stations) and 915 (using rank 4 base stations). For example, the highest throughput for rank 8 base station (curve 914 in FIG. 9) is greater than 25 Gbps and for rank 4 (curve 915) is greater than 12 Gbps.

Figure 10:
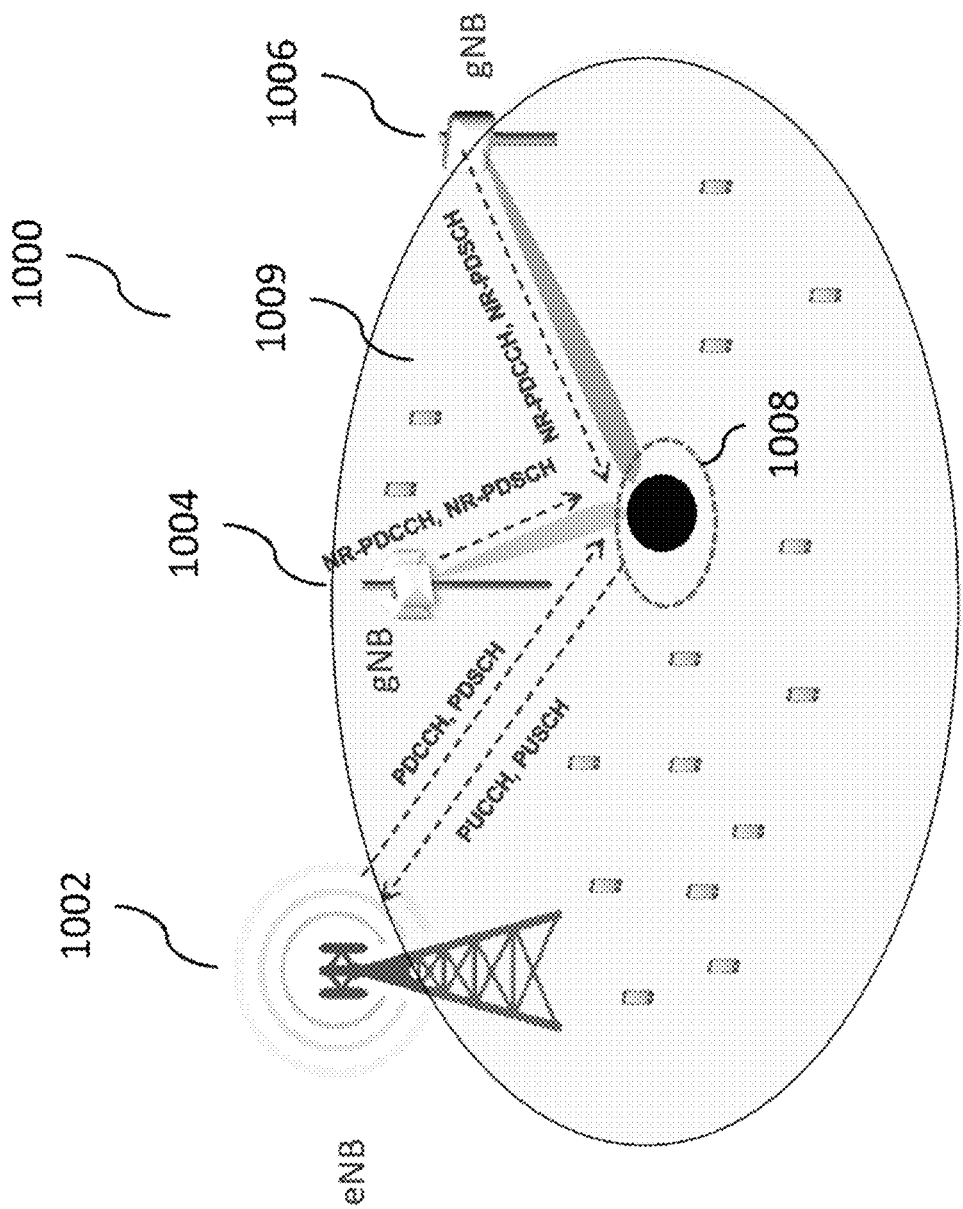
FIG. 10 illustrates an exemplary distributed MIMO (D-MIMO) multi-connectivity architecture, according to some implementations of the current subject matter.

FIG. 10 illustrates an exemplary distributed MIMO (D-MIMO) multi-connectivity architecture 1000, according to some implementations of the current subject matter. Distributed MIMO systems can implement spatial domain of mobile fading channels to provide performance improvements to wireless communication systems. In particular, such systems can effectively improve capacity, cell edge throughput, coverage, group mobility, etc. of a wireless communication network. Such improvements can be achieved using distributed antenna systems that can increase capacity by de-correlating of the MIMO sub-channels while using macro-diversity in addition to micro-diversity. Distributed antenna systems refer to networks of spatially separated antennas connected to a common source using a transport medium providing wireless service within a geographic area (i.e., a cell) or a physical location/structure (e.g., indoor coverage).

The architecture 1000 can include an eNodeB 1002, a gNodeB 1004, and a gNodeB 1006. The gNodeBs 1004, 1006 along with the user equipment 1008 (along with other user equipments) can be located within a coverage area 1009 of the eNodeB 1002. The system 1000 can be a multi-technology aggregation communication system that can allow use of a LTE technology and NR technology while implementing NR MIMO techniques discussed herein.

In some implementations, the eNodeB 1002 can transmit to the user equipment 1008 a downlink information (e.g., Physical Downlink Control Channel (PDCCH), Physical Downlink Shared Channel (PDSCH), etc.) on the downlink and receive uplink information (e.g., Physical Uplink Control Channel (PUCCH), Physical Uplink Shared Channel (PUSCH), etc.) on the uplink. The gNodeBs 1004, 1006 can transmit their respective downlink information to the user equipment 1008 (e.g., NR-PDCCH, NR-PDSCH).

In some implementations, the NR distributed MIMO architecture 1000 shown in FIG. 10 can overlay with existing eNodeB 1002 deployment. An uplink control information (UCI) can be transmitted by both gNodeBs 1004, 1006 to the eNodeB 1002. The new radio UCI (NR UCI) transmission by gNodeBs can use the same uplink frequency (e.g., PUCCH) that is being used the eNodeB 1002 for transmission on the uplink. Further, the eNodeB 1002 can decode NR UCI information that has been transmitted by the gNodeBs 1004, 1006 and share it with gNodeBs 1004, 1006.

FIG. 11 illustrates an exemplary active antenna system architecture 1100, according to some implementations of the current subject matter. The architecture 1100 can include a plurality of active antenna system clusters 1102. The clusters 1102 can be communicatively coupled to a processing unit 1106 using IP/Ethernet connections 1104. For example, the latency associated with each of the connections 1104 can be on the order of 4 Gbps per AAS cluster 1102. The processing unit 1106 can be communicatively coupled to an IP/Ethernet device 1112 (whereby latency can be reduced to 2.4 Gbps per AAS cluster 1102). The device 1112 can be further communicatively coupled to a vBBU 1114 (and in turn the EPC) via an IP/Ethernet connection 1118, where various operations support system/business support system (OSS/BSS) services 1116 can be provided. Additionally, the device 1112 can be further communicatively coupled to another processing unit 1108 via an IP/Ethernet connection 1110. The devices 1106 and 1108 can be configured to provide layer 1 and/or layer 2 functionalities.

Figure 12:
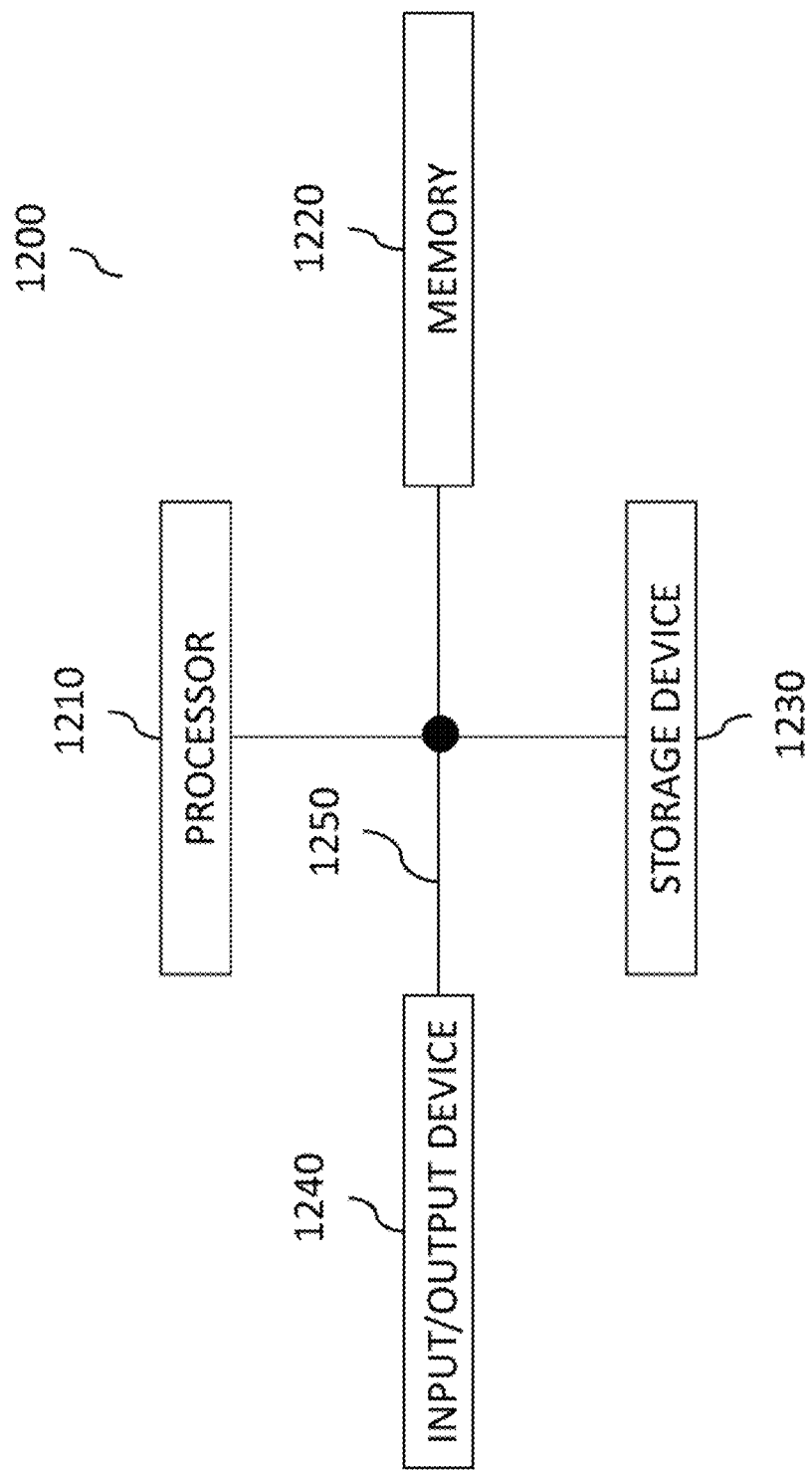
FIG. 12 illustrates an exemplary system, according to some implementations of the current subject matter.

In some implementations, the current subject matter can be configured to be implemented in a system 1200, as shown in FIG. 12. The system 1200 can include one or more of a processor 1210, a memory 1220, a storage device 1230, and an input/output device 1240. Each of the components 1210, 1220, 1230 and 1240 can be interconnected using a system bus 1250. The processor 1210 can be configured to process instructions for execution within the system 600. In some implementations, the processor 1210 can be a single-threaded processor. In alternate implementations, the processor 1210 can be a multi-threaded processor. The processor 1210 can be further configured to process instructions stored in the memory 1220 or on the storage device 1230, including receiving or sending information through the input/output device 1240. The memory 1220 can store information within the system 1200. In some implementations, the memory 1220 can be a computer-readable medium. In alternate implementations, the memory 1220 can be a volatile memory unit. In yet some implementations, the memory 1220 can be a non-volatile memory unit. The storage device 1230 can be capable of providing mass storage for the system 1200. In some implementations, the storage device 1230 can be a computer-readable medium. In alternate implementations, the storage device 1230 can be a floppy disk device, a hard disk device, an optical disk device, a tape device, non-volatile solid state memory, or any other type of storage device. The input/output device 1240 can be configured to provide input/output operations for the system 1200. In some implementations, the input/output device 1240 can include a keyboard and/or pointing device. In alternate implementations, the input/output device 1240 can include a display unit for displaying graphical user interfaces.

Figure 13:
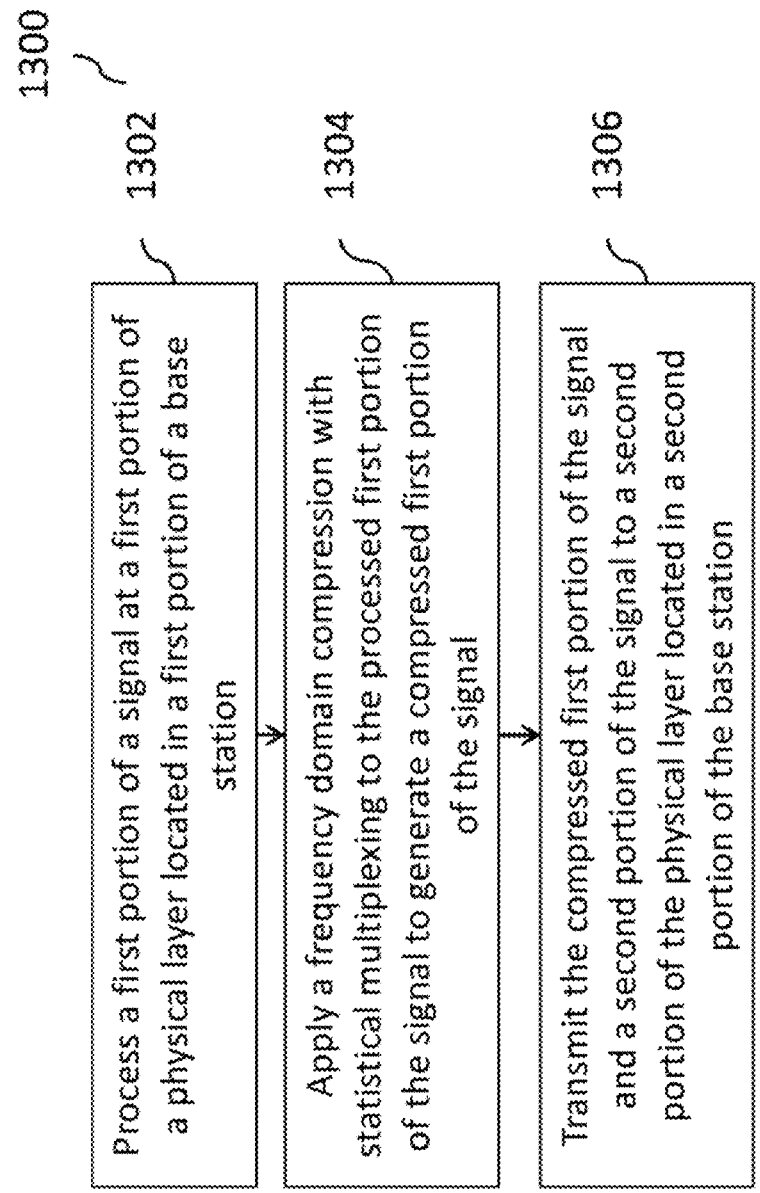
FIG. 13 illustrates an exemplary method, according to some implementations of the current subject matter.

FIG. 13 illustrates an exemplary method 1300, according to some implementations of the current subject matter. At 1302, a first portion of a signal can be processed at a first portion of a physical layer located in a first portion of a base station (e.g., in a remote unit (RU)). At 1304, a frequency domain compression with statistical multiplexing can be applied to the processed first portion of the signal to generate a compressed first portion of the signal. At 1306, the compressed first portion of the signal and a second portion of the signal can be transmitted to a second portion of the physical layer located in a second portion of the base station (e.g., in a digital unit (DU)). The data can be transmitted using MIMO techniques, with hybrid analog/digital beamforming in a layer 1 split architecture.

In some implementations, the current subject matter can include one or more of the following optional features. The first portion of the base station can include a remote unit and the second portion of the base station can include a digital unit. The first portion and the second portion can be communicatively coupled using a fronthaul link.

In some implementations, transmission can further include transmitting the compressed first portion of the signal and the second portion of the signal using multiple input multiple output processing. The multiple input multiple output processing can include at least one of the following: a single-site multiple input multiple output processing, a multiple-site multiple input multiple output processing, and a distributed multiple input multiple output processing.

In some implementations, transmission can further include performing hybrid beamforming of the signal during transmission from the first portion of the base station to the second portion of the base station. In some implementations, hybrid beamforming can include digitally combining one or more signals using at least one of the first portion and the second portion of the base station, and generating, based on the digitally combined signals, one or more beamformed analog signals for transmission by one or more antennas communicatively coupled to the base station.

In some implementations, the hybrid beamforming further includes modulating the first portion of the signals, mapping the modulated first portion of the signals to at least one portion of the physical layer, pre-coding mapped modulated first portion of the signals using at least one sub-band pre-coding matrix indicator, where the sub-band pre-coding matrix indicator can be selected for each beam for transmission of the signals, assigning one or more resources to pre-coded first portion of the signals, performing digital beamforming of one or more signals digital beams corresponding to the pre-coded first portion of the signals based on the assigned resources, and performing analog beamforming of the digitized pre-coded first portion of the signals to generate one or more analog signal beams for transmission by at least one antenna.

In some implementations, the performing of the digital beamforming can include performing wideband pre-coding of the first portion of the signals. Further, the performing of the digital beamforming can include generating the digital beams and combining the digital beams to generate one or more combined digital beams.

In some implementations, at least one antenna can include one or more antenna sub-arrays. Each antenna sub-array can generate one or more beams for transmission of the signals using a beamforming matrix between one or more antenna sub-arrays.

In some implementations, the base station can include at least one of the following: an eNodeB base station, a gNodeB base station, and any combination thereof. At least one of the first portion and the second portion of the base station can include at least one of the following: a radio transmitter and a radio receiver. The base station can be a base station operating in at least one of the following communications systems: a long term evolution communications system and a new radio communications system.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
   processing a signal using a base station, the processing including compressing a portion of the signal using frequency-domain compression; and
   applying at least one of the digital and analog beamforming to the compressed portion of the signal and an uncompressed portion of the signal, and transmitting the compressed and uncompressed portions of the signal, the transmitting including transmitting the compressed and uncompressed portions of the signal using multiple input multiple output processing, wherein the at least one of the digital and analog beamforming includes
   digitally combining one or more signals using the base station;
   generating, based on the digitally combined signals, one or more beamformed analog signals for transmission by one or more antennas communicatively coupled to the base station.

2. The method according to claim 1, wherein the base station includes at least one of the following: a centralized unit, a remote unit, a digital unit, and any combination thereof.

3. The method according to claim 1, wherein the multiple input multiple output processing includes at least one of the following: a single-site multiple input multiple output processing, a multiple-site multiple input multiple output processing, and a distributed multiple input multiple output processing.

4. The method according to claim 1, wherein the at least one of the digital and analog beamforming includes
   modulating a first portion of the one or more signals;
   mapping the modulated first portion of the one or more signals to at least one portion of the physical layer;
   pre-coding mapped modulated first portion of the one or more signals using at least one sub-band pre-coding matrix indicator, the at least one sub-band pre-coding matrix indicator is selected for each beam for transmission of the one or more signals;
   assigning one or more resources to pre-coded first portion of the one or more signals;
   performing digital beamforming of one or more signals digital beams corresponding to the pre-coded first portion of the one or more signals based on the assigned resources; and performing analog beamforming of the digitized precoded first portion of the one or more signals to generate one or more analog signal beams for transmission by at least one antenna.

5. The method according to claim 4, wherein the performing of the digital beamforming includes performing wideband pre-coding of the first portion of the one or more signals.

6. The method according to claim 4, wherein the performing of the digital beamforming includes generating the one or more digital beams and combining the one or more digital beams to generate one or more combined digital beams.

7. The method according to claim 4, wherein the at least one antenna includes one or more antenna sub-arrays, wherein each antenna sub-array is generating one or more beams for transmission of the one or more signals using a beamforming matrix between one or more antenna sub-arrays.

8. The method according to claim 1, wherein the base station includes at least one of the following: an eNodeB base station, a gNodeB base station, and any combination thereof;
the base station includes at least one of the following: a radio transmitter and a radio receiver;
the base station is configured to operate in at least one of the following communications systems: a long term evolution communications system and a new radio communications system.

9. A system comprising:
at least one programmable processor; and
a non-transitory machine-readable medium storing instructions that, when executed by the at least one programmable processor, cause the at least one programmable processor to perform operations comprising:
processing a signal using a base station, the processing including compressing a portion of the signal using frequency-domain compression; and
applying at least one of the digital and analog beamforming to the compressed portion of the signal and an uncompressed portion of the signal, and transmitting the compressed and uncompressed portions of the signal, the transmitting including transmitting the compressed and uncompressed portions of the signal using multiple input multiple output processing, wherein the at least one of the digital and analog beamforming includes
digitally combining one or more signals using the base station;
generating, based on the digitally combined signals, one or more beamformed analog signals for transmission by one or more antennas communicatively coupled to the base station.

10. The system according to claim 9, wherein the base station includes at least one of the following: a centralized unit, a remote unit, a digital unit, and any combination thereof.

11. The system according to claim 9, wherein the multiple input multiple output processing includes at least one of the following: a single-site multiple input multiple output processing, a multiple-site multiple input multiple output processing, and a distributed multiple input multiple output processing.

12. The system according to claim 9, wherein the at least one of the digital and analog beamforming includes
modulating a first portion of the one or more signals;
mapping the modulated first portion of the one or more signals to at least one portion of the physical layer;
pre-coding mapped modulated first portion of the one or more signals using at least one sub-band pre-coding matrix indicator, the at least one sub-band pre-coding matrix indicator is selected for each beam for transmission of the one or more signals;
assigning one or more resources to pre-coded first portion of the one or more signals;
performing digital beamforming of one or more signals digital beams corresponding to the pre-coded first portion of the one or more signals based on the assigned resources; and
performing analog beamforming of the digitized precoded first portion of the one or more signals to generate one or more analog signal beams for transmission by at least one antenna.

13. The system according to claim 12, wherein the performing of the digital beamforming includes performing wideband pre-coding of the first portion of the one or more signals.

14. The system according to claim 12, wherein the performing of the digital beamforming includes generating the one or more digital beams and combining the one or more digital beams to generate one or more combined digital beams.

15. The system according to claim 12, wherein the at least one antenna includes one or more antenna sub-arrays, wherein each antenna sub-array is generating one or more beams for transmission of the one or more signals using a beamforming matrix between one or more antenna sub-arrays.

16. A computer program product comprising a non-transitory machine-readable medium storing instructions that, when executed by at least one programmable processor, cause the at least one programmable processor to perform operations comprising:
processing a signal using a base station, the processing including compressing a portion of the signal using frequency-domain compression; and
applying at least one of the digital and analog beamforming to the compressed portion of the signal and an uncompressed portion of the signal, and transmitting the compressed and uncompressed portions of the signal, the transmitting including transmitting the compressed and uncompressed portions of the signal using multiple input multiple output processing, wherein the at least one of the digital and analog beamforming includes
digitally combining one or more signals using the base station;
generating, based on the digitally combined signals, one or more beamformed analog signals for transmission by one or more antennas communicatively coupled to the base station.

* * * * *